(12) United States Patent
Ishii et al.

(10) Patent No.: US 10,893,207 B2
(45) Date of Patent: Jan. 12, 2021

(54) OBJECT TRACKING APPARATUS, OBJECT TRACKING METHOD, AND NON-TRANSITORY COMPUTER-READABLE STORAGE MEDIUM FOR STORING PROGRAM

(71) Applicant: FUJITSU LIMITED, Kawasaki (JP)

(72) Inventors: Daisuke Ishii, Kawasaki (JP); Osafumi Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 16/210,043

(22) Filed: Dec. 5, 2018

(65) Prior Publication Data

US 2019/0191098 A1    Jun. 20, 2019

(30) Foreign Application Priority Data

Dec. 19, 2017 (JP) ................... 2017-243003

(51) Int. Cl.
*G06K 9/00* (2006.01)
*H04N 5/232* (2006.01)
(Continued)

(52) U.S. Cl.
CPC .......... *H04N 5/23299* (2018.08); *G06T 7/75* (2017.01); *H04N 5/23218* (2018.08); *H04N 7/181* (2013.01)

(58) Field of Classification Search
CPC .......... H04N 5/23299; H04N 5/23218; H04N 5/247; H04N 5/225; H04N 7/181; H04N 7/18; H04N 7/188; G06T 7/75; G06T 7/579; G06T 7/292; G06T 7/20; G06T 7/246; G06T 7/536; G06T 2207/30221; G06T 2207/30196; G06T 2207/30232; G06T 2207/10016; G06T 2207/30236; (Continued)

(56) References Cited

U.S. PATENT DOCUMENTS 10,701,322 B2 * 6/2020 DeAngelis ......... H04N 5/23206
10,769,810 B2 * 9/2020 Zhang ................. G06K 9/00724
(Continued)

FOREIGN PATENT DOCUMENTS

| JP | 11-250252 | 9/1999 |
|---|---|---|
| JP | 2002-008040 | 1/2002 |
| JP | 2016-127571 | 7/2016 |

*Primary Examiner* — Jose L Couso
(74) *Attorney, Agent, or Firm* — Fujitsu Patent Center

(57) ABSTRACT

An object tracking apparatus is configured to execute a tracking process, a prediction process, an influence-degree obtaining process, and a difficulty-degree obtaining process, wherein the influence-degree obtaining process is configured to obtain a backside influence degree representing that a detection of an object to be tracked is affected by other object that overlaps the object, wherein the difficulty-degree obtaining process is configured to calculate, for each object to be tracked, a detection difficulty degree for detecting the object from each of next frames captured by respective cameras, based on the backside influence degree, wherein the tracking process is configured to select the next frame that is included in a set of next frames in a pieces of video and from which the object is to be detected, based on the detection difficulty degree, and detect the object from the selected next frames.

15 Claims, 20 Drawing Sheets

(51) Int. Cl.
*H04N 7/18* (2006.01)
*G06T 7/73* (2017.01)

(58) Field of Classification Search
CPC .......... G06T 2207/30241; G03B 15/00; G03B 17/00; G08B 13/196; G08B 13/19606; G08B 13/19608; G08B 13/1961; G08B 13/19645; G06K 9/00771; G06K 9/00624; G06K 9/46; G06K 9/2054; G06K 9/3241; G06K 9/00369; G06K 2009/3291

See application file for complete search history.

(56) References Cited

U.S. PATENT DOCUMENTS

| | | | |
|---|---|---|---|
| 10,783,491 B2 * | 9/2020 | Buibas | G06T 7/74 |
| 2008/0031492 A1 * | 2/2008 | Lanz | G06T 7/251 |
| | | | 382/103 |
| 2008/0130948 A1 * | 6/2008 | Ozer | G06K 9/3241 |
| | | | 382/103 |
| 2008/0166045 A1 * | 7/2008 | Xu | G06T 7/251 |
| | | | 382/170 |
| 2009/0296989 A1 * | 12/2009 | Ramesh | G08B 13/19608 |
| | | | 382/103 |
| 2014/0347475 A1 * | 11/2014 | Divakaran | G06K 9/00771 |
| | | | 348/135 |
| 2015/0310273 A1 * | 10/2015 | Shreve | G06T 5/005 |
| | | | 382/103 |
| 2019/0130165 A1 * | 5/2019 | Seshadri | G06T 11/60 |
| 2020/0166944 A1 * | 5/2020 | Tsai | G06K 9/00664 |
| 2020/0285845 A1 * | 9/2020 | Oami | G01B 11/022 |

\* cited by examiner

FIG. 3

| ID | DETECTION DIFFICULTY DEGREE | | | | | | | |
|---|---|---|---|---|---|---|---|---|
| | cam1 | cam2 | cam3 | cam4 | cam5 | cam6 | cam7 | cam8 |
| 1 | 15 | 3.4 | -- | -- | 7.5 | -- | 1.5 | 4.1 |
| 2 | 9.5 | 4.2 | -- | -- | 11.1 | -- | 5.8 | 7.8 |
| 3 | -- | 4.1 | -- | -- | 15.1 | -- | 5.8 | 6.5 |
| 4 | 16 | 15 | -- | -- | 12.3 | -- | 13.8 | 9.5 |
| ⋮ | ⋮ | ⋮ | ⋮ | ⋮ | ⋮ | ⋮ | ⋮ | ⋮ |

195

OBJECT TRACKING APPARATUS, OBJECT TRACKING METHOD, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2017-243003, filed on Dec. 19, 2017, the entire contents of which are incorporated herein by reference.

FIELD

The embodiments discussed herein are related to an object tracking program, an object tracking apparatus, an object tracking method, and a non-transitory computer-readable storage medium for storing a program for an object tracking.

BACKGROUND

One known technology for detecting and tracking a moving object in video is a technology for detecting an object from pieces of video captured in a same period of time by respective cameras that share a field of view and tracking the detected object. In this type of technology, since an object to be tracked is detected from each of pieces of video captured from different directions, it is possible to track a real-space three-dimensional position of the object to be tracked. Thus, this type of technology is applied to, for example, tracking each player in captured video of a sports game.

In addition, there is a known technology in which when the three-dimensional position of an object to be tracked is to be detected from pieces of video captured by respective cameras, the video in which the object to be tracked is shown is selected from the pieces of video, and the three-dimensional position of the object is calculated. For example, there is a known technology in which occurrence of an occlusion is predicted, an object is detected from video captured by, of a plurality of cameras, the camera with which no occlusion occurs, and the three-dimensional position of the object is calculated.

Examples of the related art include Japanese Laid-open Patent Publication No. 2002-008040.

SUMMARY

According to an aspect of the embodiments, an object tracking apparatus includes: a memory; and a processor coupled to the memory and configured to execute a tracking process that includes detecting one or more objects to be tracked from frames included in a set of frames of a same time point in pieces of video captured by respective cameras, and calculating, for each object to be tracked, a three-dimensional position of the object in real space, based on positions of the object in the frames from which the object is detected, execute, for each object to be tracked, a prediction process that includes predicting positions of the object in next frames that are included in the pieces of video and from which the object is to be detected next, based on the three-dimensional position of the object, execute an influence-degree obtaining process that includes comparing, for each object to be tracked, a feature of the object to be tracked in each of the next frames in the pieces of video with a feature of another object that overlaps the object to be tracked at a back side of each predicted position of the object to be tracked, based on a prediction result of the position of the object in the next frame, to calculate a backside influence degree that the other object has on detection of the object to be tracked, and execute a difficulty-degree obtaining process that includes calculating, for each object to be tracked, a detection difficulty degree for detecting the object from each of the next frames captured by the respective cameras, based on the backside influence degree, wherein the tracking process is configured to select, for each object to be tracked, the next frame that is included in the set of next frames in the pieces of video and from which the object is to be detected, based on the detection difficulty degree, and detect the object from the selected next frames.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart illustrating details of priority camera information;

DESCRIPTION OF EMBODIMENTS

When the number of objects to be tracked is two or more, and the objects are mingled in a complex manner, the state of the surroundings of the object to be tracked in video varies in a complex manner. During detection of each object to be tracked from the video, when a feature of the object to be detected and an in-video feature of the surroundings of the object are similar to each other, the detection accuracy of the object decreases. Thus, even with video captured by a camera with which no occlusion occurs, when a feature of an object to be tracked and an in-video feature of another object that overlaps the object to be tracked at the back side of the object to be tracked are similar to each other, the detection accuracy of the object to be tracked may decrease. When the detection accuracy of the object decreases, the tracking accuracy of the object decreases.

According to one aspect, the present disclosure is intended to improve the tracking accuracy during tracking of an object in video.

First Embodiment

Figure 1:
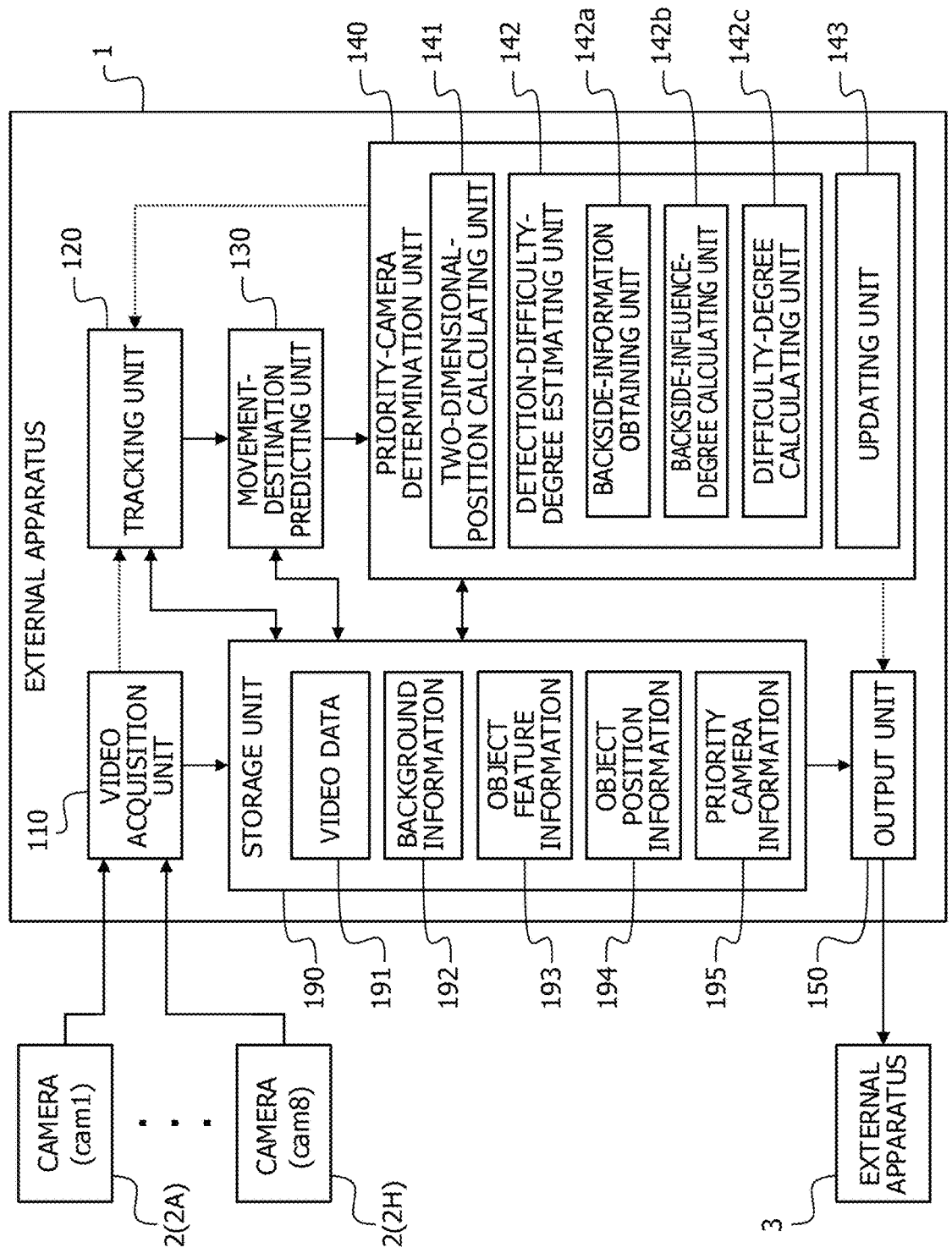
FIG. 1 is a diagram illustrating the functional configuration of an object tracking apparatus according to a first embodiment.

FIG. 1 is a diagram illustrating the functional configuration of an object tracking apparatus according to a first embodiment.

As illustrated in FIG. 1, an object tracking apparatus 1 of the present embodiment includes a video acquisition unit 110, a tracking unit 120, a movement-destination predicting unit 130, a priority-camera determination unit 140, an output unit 150, and a storage unit 190.

The video acquisition unit 110 acquires a plurality of pieces of video captured by respective cameras 2. The video acquisition unit 110 causes the acquired plurality of pieces of video to be stored in the storage unit 190 as video data 191 in a form with which the corresponding cameras 2 are identifiable. The acquired plurality of pieces of video is pieces of video captured by the respective cameras 2 arranged in a manner that they capture video with different fields of view in a predetermined image-capture area. Each of the acquired pieces of video includes a segment whose images were captured in a period from a first time point to a second time point. In the following description, the pieces of video that are captured by the respective camera 2 are referred to simply as "pieces of video".

The tracking unit 120 detects, in the pieces of video, an object to be tracked and tracks the object. The tracking unit 120 performs a process for detecting, for each set of frames captured at a same time point in the respective pieces of video, an object from the set of frames and tracking the object in a time series. By using priority camera information 195 stored in the storage unit 190, the tracking unit 120 in the object tracking apparatus 1 in the present embodiment detects an object to be tracked and tracks the object. The priority camera information 195 includes information indicating the camera 2 that captures a frame that is included in the frames included in the set of frames to be subjected to a tracking process and to which priority is to be given in a process in which the tracking unit 120 tracks an object being tracked. For example, the tracking unit 120 uses the priority camera information 195 to narrow down one set of frames to a frame from which an object being tracked is to be detected during detection and tracking of the object from the set of frames. For example, for detecting one object being tracked from a set of frames, the tracking unit 120 sets, as a frame from which the object is to be detected, only a frame that is included in the frames included in the set of frames and that was captured by the camera(s) 2 with which the detection difficulty degree(s) in the priority camera information 195 is smaller than or equal to a threshold.

The tracking unit 120 detects an object being tracked from each of the frames that are included in one set of frames and with which the detection difficulty degrees determined using the priority camera information 195 are low and tracks the object. In accordance with a known detection method, the tracking unit 120 detects each object being tracked in frames. For example, the tracking unit 120 detects, as a region indicating an object being tracked, a region having a highest degree of similarity with an in-video feature of the object being tracked in frames. The in-video feature of the object being tracked is stored, for example, in object feature information 193 stored in the storage unit 190. The in-video feature may be any of a feature about color, a feature about a shape, and a feature about a texture. Examples of the feature about color include, a pixel value, a color histogram, a brightness histogram. Examples of the feature about a shape include a Haar-like feature, a feature in the histogram of oriented gradients (HOG), and a feature in scale invariance feature transform (SIFT). The feature about a texture is, for example, a local binary pattern (LBP) feature.

With respect to all frames included in one set of frames, the tracking unit 120 detects an object to be newly tracked. In accordance with a known detection method, the tracking unit 120 detects an object to be newly tracked in the frames. When an object to be tracked is newly detected, the tracking unit 120 stores, in the object feature information 193 in the storage unit 190, information indicating an in-video feature of the detected object.

The tracking unit 120 also calculates a three-dimensional position of the object being tracked and a real-space three-dimensional position of the object to be newly tracked. In accordance with a known calculation method, the tracking unit 120 calculates the real-space three-dimensional position of the object in each frame. For example, based on the positions of an object in respective frames from which the object was detected and the fields of view of the cameras 2 that captured the respective frames, the tracking unit 120 calculates the real-space three-dimensional position of the detected object. The tracking unit 120 stores the calculated three-dimensional position in object position information 194 in the storage unit 190.

Based on a change in the three-dimensional position of the object with time, the three-dimensional position being calculated from the set of frames, the movement-destination predicting unit 130 predicts a movement destination of the object. Based on the object three-dimensional position stored in the object position information 194, the movement-destination predicting unit 130 calculates a three-dimensional position of the object at the image-capture time point of a set of next frames. For example, based on an object position calculated from a set of frames at time point t and an object position calculated from a set of frames (for example, a set of frames at time point t−Δt) prior to the set of frames at time point t, the movement-destination predicting unit 130 calculates a position of the object at the image-capture time point of a set of next frames.

The priority-camera determination unit 140 determines detection difficulty degrees for detecting an object to be tracked from respective frames included in the set of next frames, based on a prediction result of the movement destination of the object, the prediction result being obtained by the movement-destination predicting unit 130. The priority-camera determination unit 140 then updates the priority camera information 195. The priority-camera determination unit 140 in the object tracking apparatus 1 in the present embodiment includes a two-dimensional-position calculating unit 141, a detection-difficulty-degree estimating unit 142, and an updating unit 143.

Based on the prediction result of the movement destination of the object being tracked, the two-dimensional-position calculating unit 141 calculates (predicts), for each frame included in one set of frames, the two-dimensional position of the object in a frame plane at the image-capture time point of the next frame. The frame plane is a plane that is set in real space based on the field of view and the focal distance of each camera and that includes a projection plane (projection region) of the object in an image-capture range. The two-dimensional position in the frame plane is a position with respect to coordinate axes in two-dimensional coordinates indicating a position in a projection plane in real space (in other words, a position in a frame). That is, there are cases in which the object two-dimensional position calculated by the two-dimensional-position calculating unit 141 is located outside the frames.

Based on the two-dimensional position indicating the movement destination of each object in a frame, background information 192, and the object feature information 193, the detection-difficulty-degree estimating unit 142 estimates, for each object being tracked, a difficulty degree for detecting the object from each of the next frames in pieces of video. The detection-difficulty-degree estimating unit 142 in the object tracking apparatus 1 in the present embodiment includes a backside-information obtaining unit 142a, a backside-influence-degree calculating unit 142b, and a difficulty-degree calculating unit 142c.

The backside-information obtaining unit 142a obtains, for each frame, a feature of another object that exists at the back side of an object being tracked, the back side being located at an in-frame movement destination of the object being tracked, and in the surroundings of the object being tracked. The backside-information obtaining unit 142a obtains a feature of the other object from the background information 192 and the object feature information 193. The background information 192 includes features in video captured in a state in which the object to be tracked does not exist in the field of view of each camera 2 (for example, features of a floor surface and a building). When the object to be tracked is a portion of a moving object, the backside-information obtaining unit 142a obtains, as a feature of another object, a feature of an accompanying portion that moves in conjunction with the object to be tracked. For example, when the object to be tracked is a human head, the backside-information obtaining unit 142a obtains, in conjunction with a feature of the head, a feature of an accompanying portion that is a portion below the neck of the person.

Based on a feature of one object to be tracked and a feature of the surroundings of the object which is extracted based on the obtained backside information, the backside-influence-degree calculating unit 142b calculates a backside influence degree $D_{BG}$ that the state of the back side of the object has on the detection accuracy for detecting the object from a next frame. The backside-influence-degree calculating unit 142b calculates the backside influence degree $D_{BG}$, for example, by using a conversion equation with which the backside influence degree $D_{BG}$ increases as the degree of similarity between a feature of one object being tracked and a feature of the surroundings of the object increases.

Based on the backside influence degree $D_{BG}$ for the object calculated for each frame included in one set of frames, the difficulty-degree calculating unit 142c calculates a detection difficulty degree $D_{CP}$ in a next frame for the object. The difficulty-degree calculating unit 142c in the object tracking apparatus 1 in the present embodiment sets the backside influence degree $D_{BG}$ as the detection difficulty degree $D_{CP}$.

Based on the detection difficulty degree $D_{CP}$ calculated by the detection-difficulty-degree estimating unit 142, the updating unit 143 updates the priority camera information 195 in the storage unit 190.

The output unit 150 outputs pieces of information including the video data 191 and the object position information 194 to an external apparatus 3. The external apparatus 3 performs various types of process, for example, including a process for combining movement paths of people with the video data 191, based on the object position information 194.

As described above, the object tracking apparatus 1 in the present embodiment uses the priority camera information 195 to detect an object being tracked from pieces of video captured by the respective cameras and track the object. This type of object tracking apparatus 1 is applied to, for example, an object tracking system for detecting people from video acquired by a plurality of cameras capturing images of a space in which the people are moving and for tracking the detected people.

Figure 2:
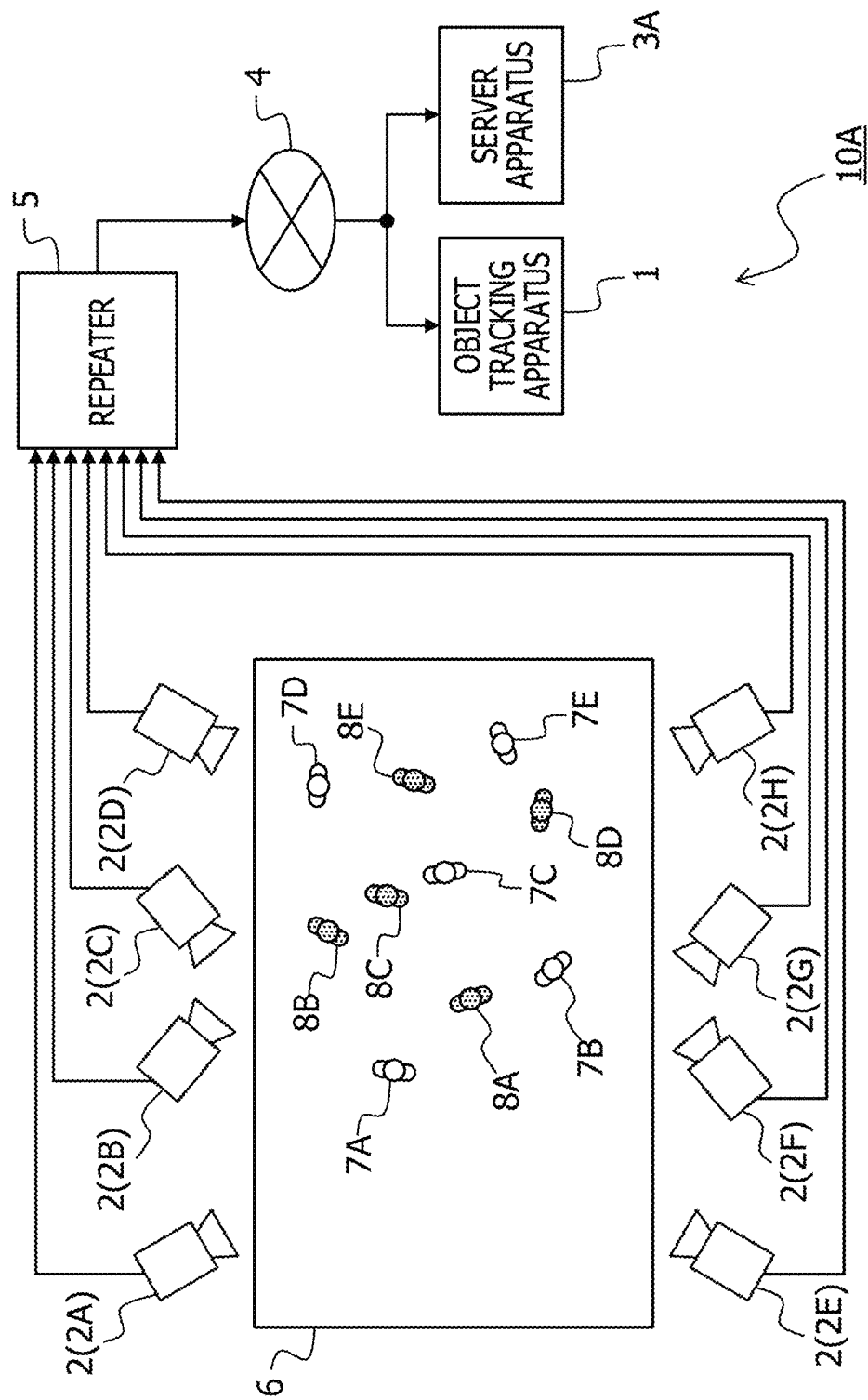
FIG. 2 is a diagram illustrating a system configuration example of an object tracking system.

FIG. 2 is a diagram illustrating a system configuration example of an object tracking system.

As illustrated in FIG. 2, an object tracking system 10A includes, for example, the object tracking apparatus 1 and eight cameras 2 (2A to 2H).

The eight cameras 2 are arranged so that video in a predetermined image-capture area 6 is captured from different positions. The image-capture area 6 is, for example, a playing area for various types of sports. When the image-capture area 6 is a basketball playing area, the eight cameras 2 capture, from different positions, video of a basket court in which people (players) 7A to 7E and 8A to 8E are moving. Each of the eight cameras 2 transmits data of the captured video to the object tracking apparatus 1. In the object tracking system 10A illustrated in FIG. 2, a repeater 5, which is connected to a communications network 4, such as the Internet, aggregates pieces of video data output from the respective eight cameras 2 and transmits the resulting video data to the object tracking apparatus 1 through the communications network 4. Based on the received pieces of video, the object tracking apparatus 1 detects the individual people (players) 7A to 7E and 8A to 8E in the pieces of video, calculates three-dimensional positions thereof, and tracks them. Also, the object tracking apparatus 1 outputs, for example, tracking results (changes in the three-dimensional positions with time) of the people 7A to 7E and 8A to 8E in the pieces of video to an external apparatus, such as a server apparatus 3A. The server apparatus 3A, for example, adds information or the like indicating the positional relationships of the people 7A to 7E and 8A to 8E in the pieces of video respectively captured by the eight cameras 2 to the pieces of video and delivers the resulting pieces of video to a client apparatus, not illustrated.

The object tracking apparatus 1 in the object tracking system 10A illustrated in FIG. 2 calculates the three-dimensional positions of objects to be tracked, based on the positional relationships of the objects to be tracked in frames of a same time point in pieces of video captured by the eight cameras 2. However, since the objects (people) to be tracked are moving in the image-capture area 6, there are cases in which some of the players are not shown in the frames of the same time point. For example, the person 7D who is in the image-capture area 6 in FIG. 2 is not shown in the pieces of video captured by the first camera 2A, the third camera 2C, and the seventh camera 2G of the eight cameras 2A to 2H. Thus, excluding, from the plurality of frames, the frames captured by the first camera 2A, the third camera 2C, and the seventh camera 2G during detection of the person 7D being tracked allows the object tracking apparatus 1 to efficiently perform a process for tracking the person 7D. For example, when the person 7D is detected from a frame in which a feature of the person 7D and a feature of another object that overlaps the person 7D at the back side of the person 7D are similar to each other, the boundary between the person 7D and the other object in the frame (video) becomes unclear, thus reducing the detection accuracy of the person 7D. When the detection accuracy of an object being tracked decreases, the accuracy of calculating the three-dimensional position of the object decreases, thus making it difficult to correctly track the three-dimensional position of the object. Thus, in the object tracking apparatus 1 in the present embodiment, the priority camera information 195 is used to track an object to be tracked, thereby improving the tracking accuracy of the object.

FIG. 3 is a flowchart illustrating details of the priority camera information.

IDs in the priority camera information 195 illustrated in FIG. 3 are identifiers for identifying objects being tracked (for example, people). Also, cam1 to cam8 in the priority camera information 195 in FIG. 3 are identifiers for identifying the eight cameras 2 (2A to 2H) that captures video. That is, detection difficulty degrees $D_{CP}$ for respective frames of a same time point in pieces of video respectively captured by the eight cameras 2A to 2H, the detection difficulty degrees $D_{CP}$ being used for detecting an object being tracked from the frames, are registered in the priority camera information 195 in FIG. 3. Each detection difficulty degree $D_{CP}$ is a numerical value indicating a degree of difficulty in detecting a certain object from a corresponding frame, and the detection difficulty degree $D_{CP}$ in the present embodiment is adapted such that, the larger the numerical value is, the more difficult the detection is. Also, "--" in the detection difficulty degrees $D_{CP}$ in the priority camera information 195 in FIG. 3 indicates that the position of an object at the image-capture time point of a corresponding frame is outside of the field of view of the corresponding camera (that is, outside the image capture range). That is, the priority camera information 195 includes information indicating cameras that captured frames in which each object being tracked is shown and information indicating difficulty degrees for detecting the object being tracked from the corresponding frames in which the object is shown. For example, an object with ID=1 is not shown in frames captured by respective cameras to which cam3, cam4, and cam6 are assigned. Of five frames captured by the respective cameras to which cam1, cam2, cam5, cam7, and cam8 are assigned, the frame with which it is the easiest to detect the object with ID=1 is the frame captured by the camera to which cam7 is assigned.

When the tracking unit 120 detects an object from video (frames) and tracks the object, the object tracking apparatus 1 in the present embodiment uses the priority camera information 195 indicating the detection difficulty degrees $D_{CP}$ for the object in respective frames included in one set of frames. Thus, based on the priority camera information 195, the tracking unit 120 allows video (frames) that is included in a plurality of frames and from which an object is to be detected and tracked to be narrowed down to only frames in which the object to be detected is shown and with which it is easy to detect the object. For example, when the object with ID=1 is to be tracked, the tracking unit 120 may omit the process for detecting the object from the frames respectively captured by the cameras to which cam3, cam4, and cam6 are assigned, based on the priority camera information 195. For example, when a condition for each frame from which an object is to be detected is a frame with which the detection difficulty degree $D_{CP}$ is smaller than or equal to 10, the tracking unit 120 may narrow down the frames from which the object with ID=1 is to be detected and tracked to four frames, based on the priority camera information 195. In addition, when the frames from which an object is to be detected are to be narrowed down based on the priority camera information 195, for example, the condition for each frame from which the object is to be detected may also be, in an ascending order of the detection difficulty degrees $D_{CP}$ of the frames, three frames with which the detection difficulty degrees $D_{CP}$ are smaller than or equal to 10. Since the frames from which an object being tracked is to be detected are narrowed down based on the priority camera information 195, as described above, the object tracking apparatus 1 in the present embodiment improves the detection accuracy for detecting of an object in video and improves the tracking accuracy of the object. Also, since the frames from which an object being tracked is to be detected are narrowed down based on the priority camera information 195, the object tracking apparatus 1 in the present embodiment makes it possible to reduce the amount of processing performed by the tracking unit 120.

For example, when the number of objects being tracked is two or more, the priority camera information 195 may also be used to determine the order of tracking the objects. For example, based on the priority camera information 195, the tracking unit 120 may detect, in the order of ease of detecting the objects being tracked, the objects from a frame with which the detection difficulty degree $D_{CP}$ is low and may track the objects.

For example, when a sum SD of the three detection difficulty degrees $D_{CP}$ of the detection difficulty degrees $D_{CP}$ for the respective objects in the priority camera information 195 in FIG. 3 is calculated, value, a sum SD(1) for the object with ID=1 is 9.0. When sums SD(2), SD(3), and SD(4) for the objects with ID=2, 3, and 4 are calculated, SD(2)=17.8, SD(3)=16.4, and SD(4)=35.6 are obtained respectively. In this case, it is preferable that the tracking unit 120 perform a tracking process in the order of the object with ID=1, the object with ID=3, the object with ID=2, and the object with ID=4.

The detection difficulty degree for detecting an object to be tracked from video is associated with the detection accuracy of the object, and the detection accuracy tends to decrease as the detection difficulty degree increases. Thus, when a plurality of objects is to be detected from one frame, there is a case in which a candidate position of the object that is included in the plurality of objects and for which the detection difficulty degree is high is detected at a plurality portions in the frame. In such a case, when the object that is included in the plurality of objects and for which the detection difficulty degree is low is first detected, and any of the plurality of candidate portions of the object for which the detection difficulty degree is high overlaps the detection position of the object for which the detection difficulty degree is low, the overlapping position may be excluded from the candidates. Thus, in the object tracking apparatus 1 in the present embodiment, when the priority camera information 195 is used to determine an order of tracking objects, it is possible to inhibit error in the detection position of an object for which the detection difficulty degree is high, thus improving the object detection accuracy.

Thus, in the object tracking apparatus 1 in the present embodiment, since the priority camera information 195 is used to detect and track an object being tracked, the detection accuracy of the object being tracked improves, and the object tracking accuracy improves.

For example, in parallel with the process for obtaining pieces of video from the respective cameras 2, the object tracking apparatus 1 in the present embodiment performs the process for detecting an object to be tracked from the obtained pieces of video and tracking the object. The object tracking apparatus 1 in the present embodiment performs, for example, a process according to the flowchart in FIG. 4 as the process for detecting, from pieces of video, an object to be tracked and tracking the object.

Figure 4:
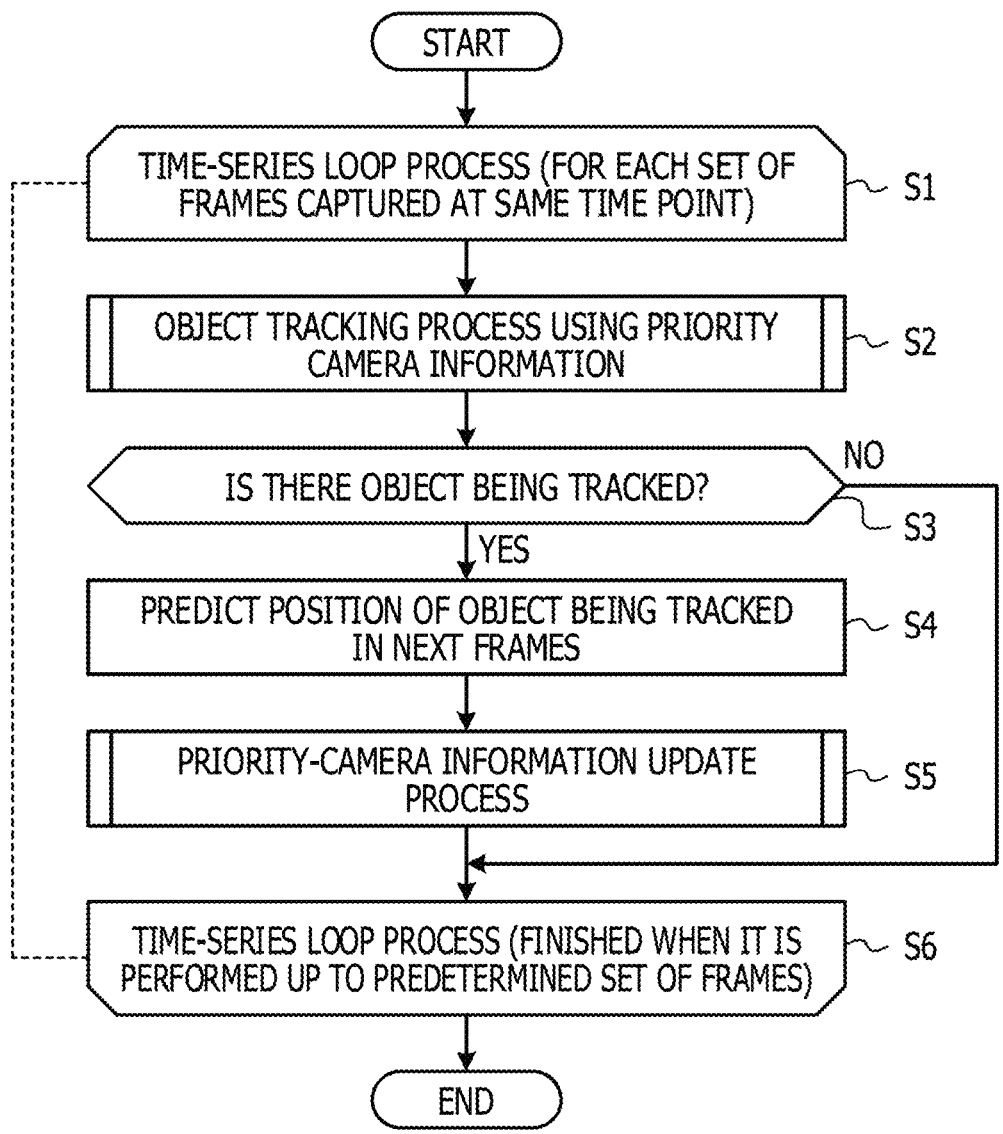
FIG. 4 is a flowchart illustrating a process performed by the object tracking apparatus according to the first embodiment.

FIG. 4 is a flowchart illustrating a process performed by the object tracking apparatus according to the first embodiment.

The object tracking apparatus 1 in the present embodiment performs a time-series loop process (steps S1 to S6) as the process for detecting an object to be tracked from pieces of video and tracking the object. The time-series loop process is a process to be performed on each set of frames included in pieces of video and captured at a same time point. For example, at the starting end (step S1) of the time-series loop process, the object tracking apparatus 1 selects a set of frames to be processed, the frames being captured at a same time point t. For example, at the last end (step S6) of the time-series loop process, the object tracking apparatus 1 determines whether or not the time-series loop process has been performed up to a predetermined set of frames. When the time-series loop process has been performed up to the predetermined set of frames, the object tracking apparatus 1 ends the time-series loop process. When there is an unprocessed set of frames, the object tracking apparatus 1 updates the time point t at which a set of frames is to be specified and continues the time-series loop process.

After selecting the set of frames to be processed, the object tracking apparatus 1 performs an object tracking process (step S2) using the priority camera information 195. The object tracking process in step S2 is performed by the tracking unit 120 in the object tracking apparatus 1.

The object tracking process performed by the tracking unit 120 includes a first detection process for detecting an object being tracked from frames included in a set of frames that is currently processed and a second detection process for detecting an object to be newly tracked from frames included in the set of frames. The object tracking process performed by the tracking unit 120 further includes a process for calculating three-dimensional positions of the objects detected in the first and second detection processes.

In the first detection process, the tracking unit 120 selects, for each object being tracked, a plurality of frames from which the object is to be detected, based on the priority camera information 195, and detects the object from each of the selected plurality of frames. In accordance with a known detection method, the tracking unit 120 detects the object to be tracked from each of the selected frames. For example, the tracking unit 120 sets, in each frame, a search range of the object to be detected, based on a predicted position of the object which is stored in the object position information 194, and searches for a partial region that is included in the search range and whose degree of similarity with a feature of the object is the highest. In this case, the tracking unit 120 detects, as a region showing the object to be tracked, a partial region that is included in the search range and whose degree of similarity with a feature of the object is the highest.

In the second detection process, the tracking unit 120 detects, for each frame included in the set of frames that is currently processed, an object that satisfies a condition for an object to be tracked and whose tracking has not yet been started. In accordance with the known detection method, the tracking unit 120 detects an object to be newly tracked. For example, the tracking unit 120 searches for, for each frame, a region that satisfies the condition for an object to be tracked, and detects, as a region showing an object to be newly tracked, a region that is included in regions satisfying the condition for the object and that does not overlap the detection position of the object being tracked.

In the process for calculating the three-dimensional position of an object, the tracking unit 120 calculates, for each object to be tracked, the real-space three-dimensional position of the object, based on detection positions thereof in the respective frames from which the object was detected. The tracking unit 120 calculates the three-dimensional position of each object in accordance with the known calculation method. For example, by using a visual volume intersection method, the tracking unit 120 calculates the three-dimensional position of each object by using frames from which the object is detected.

After finishing the object tracking process in step S2, the object tracking apparatus 1 determines whether or not there is an object being tracked (step S3). When there is an object being tracked (YES in step S3), the object tracking apparatus 1 predicts the positions of the object being tracked in next frames (step S4) and performs a priority-camera information update process (step S5). Thereafter, the object tracking apparatus 1 determines whether or not the time-series loop process has been performed up to a predetermined set of frames (step S6). On the other hand, when there is no object being tracked (NO in step S3), the object tracking apparatus 1 skips the processes in steps S4 and S5 and determines whether or not the time-series loop process has been performed up to the predetermined set of frames (step S6).

The process in steps S4 that the object tracking apparatus 1 performs when there is an object being tracked is performed by the movement-destination predicting unit 130 in the object tracking apparatus 1. In accordance with the known prediction method, the movement-destination predicting unit 130 predicts the three-dimensional position of the object in the next frames. For example, the movement-destination predicting unit 130 predicts (calculates) the three-dimensional position of the object in next frames, by using the three-dimensional position of the object which was calculated based on the set of frames that is currently processed and the three-dimensional position of the object which was calculated based on a set of frames prior to the current set of frames.

The priority-camera determination process in step S5 that the object tracking apparatus 1 performs after the process in steps S4 is performed by the priority-camera determination unit 140 in the object tracking apparatus 1. Based on a prediction result of the three-dimensional position of the object in the next frames, the priority-camera determination unit 140 calculates a movement destination of the object in each piece of video (a frame) captured by each camera 2 and obtains backside information at the movement destination. The backside information is information indicating, at the predicted movement destination of the object in the corresponding next frame, a feature of a background and another object that overlap that object at the back side of that object. Thereafter, based on the similarity between the feature of the object being tracked and the obtained backside information, the priority-camera determination unit 140 calculates the detection difficulty degrees $D_{CP}$ of the object in each of the next frame and updates the detection difficulty degrees $D_{CP}$ in the priority camera information 195.

As described above, the process for detecting an object from pieces of video and tracking the object, the process being performed by the object tracking apparatus 1 in the present embodiment, includes the object tracking process (step S2) using the priority camera information 195 and the priority-camera determination process (step S5) for updating the priority camera information 195.

The object tracking process (step S2) using the priority camera information 195 is performed by the tracking unit 120 in the object tracking apparatus 1, as described above. The tracking unit 120 in the object tracking apparatus 1 in the present embodiment performs, for example, a process according to the flowchart in FIG. 5 as the object tracking process.

Figure 5:
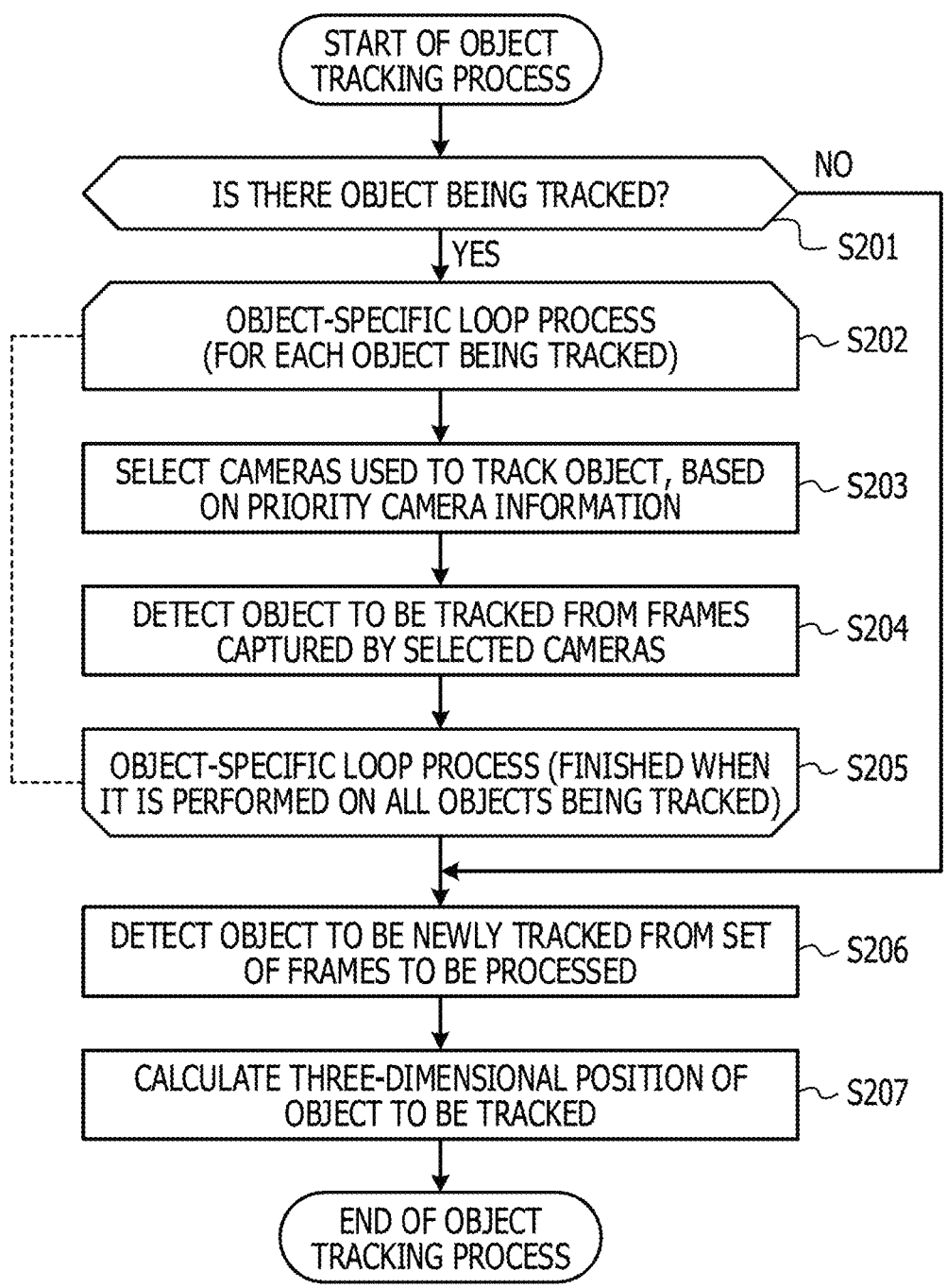
FIG. 5 is a flowchart illustrating details of an object tracking process using the priority camera information.

FIG. 5 is a flowchart illustrating details of the object tracking process using the priority camera information.

As illustrated in FIG. 5, the tracking unit 120 first determines whether or not there is an object being tracked (step S201). For example, by referring to the object feature information 193 in the storage unit 190, the tracking unit 120 determines whether or not there is an object being tracked. When there is an object being tracked (YES in step S201), the tracking unit 120 performs an object-specific loop process (steps S202 to S205) for detecting the object being tracked from the frames included in the set of frames that is currently processed and tracking the object.

For example, at the starting end (step S202) of the object-specific loop process (steps S202 to S205), the tracking unit 120 selects one object to be processed from objects being tracked. In accordance with a predetermined selection rule, the tracking unit 120 selects the object to be processed. The object selection rule is, for example, selecting objects in an order that they were registered in the object feature information 193 or the priority camera information 195. The object selection rule may also be, for example, selecting objects in an ascending order of the sums SD of the detection difficulty degrees $D_{CP}$ in the priority camera information 195.

Upon selecting an object to be processed, the tracking unit 120 determines cameras used to track the selected object, based on the priority camera information 195 (step S203). The tracking unit 120 selects the cameras used to track the object, based on information indicating priorities of the cameras associated with the selected object in the priority camera information 195.

For example, the information indicating the priorities of the cameras in the priority camera information 195 in FIG. 3 is a set of the detection difficulty degrees $D_{CP}$ for the respective cameras. For determining the cameras used to track an object based on the priority camera information 195 in FIG. 3, the tracking unit 120 selects the cameras used to track the object, based on the values of the detection difficulty degrees $D_{CP}$ for the respective cameras. For example, the tracking unit 120 determines the cameras used to track the object, the cameras being included in the cameras for which the detection difficulty degrees $D_{CP}$ in the priority camera information 195 in FIG. 3 do not indicate "--". In this case, when the object to be tracked is assumed to be the object with ID=1, the tracking unit 120 selects the cameras used to track the object from five cameras cam1, cam2, cam5, cam7, and cam8.

The cameras used to track the object may be limited to, for example, of all cameras having fields of view within which the object to be detected is located, the cameras with which the detection difficulty degrees $D_{CP}$ are smaller than or equal to a threshold. For example, for detecting the object with ID=1 in the priority camera information 195 in FIG. 3 and tracking the object, the tracking unit 120 may select, as the cameras used to track the object, four cameras cam7, cam2, cam8, and cam5 with which the detection difficulty degrees $D_{CP}$ are 10 or smaller.

For determining the cameras used to track an object, for example, K cameras may be extracted in an ascending order of the detection difficulty degrees $D_{CP}$ from all cameras having fields of view within which the object to be detected is located, and the K cameras may be determined to be the cameras used to track the object. For example, for detecting the object with ID=1 in the priority camera information 195 in FIG. 3 and tracking the object, the tracking unit 120 may determine three cameras cam7, cam2, and cam8 with which the detection difficulty degrees $D_{CP}$ are small as the cameras used to track the object.

Next, the tracking unit 120 detects the object that is currently tracked from frames captured by the cameras used to track the object, the frames being included in the set of frames that is currently processed (step S204). The process in steps S204 is a camera-specific loop process in which a process for detecting an object is performed for each camera (frame) used to track an object. In the camera-specific loop process, the tracking unit 120 repeats a process for selecting a camera used to track an object in accordance with a predetermined selection rule and detecting the object from a frame captured by the camera. The camera selection rule is, for example, selecting the cameras in the order that they were registered in the priority camera information 195. The camera selection rule may also be, for example, selecting the cameras in an ascending order of the detection difficulty degrees $D_{CP}$ in the priority camera information 195. For example, when the object with ID=1 in the priority camera information 195 in FIG. 3 is to be detected from frames captured by the cameras to which cam7, cam2, and cam8 are assigned, the tracking unit 120 performs one of the processes (1) and (2) described below as the process in steps S204.

(1) A process for detecting the object with ID=1 in an order of a frame captured by the camera to which cam2 is assigned, a frame captured by the camera to which cam7 is assigned, and a frame captured by the camera to which cam8 is assigned.
  (2) A process for detecting the object with ID=1 in an order of a frame captured by the camera to which cam7 is assigned, a frame captured by the camera to which cam2 is assigned, and a frame captured by the camera to which cam8 is assigned.

After performing the process in step S203 for selecting all of the cameras determined to be the cameras used to track the object and detecting the object, the tracking unit 120 finishes the process in steps S204 (the camera-specific loop process).

After finishing the process in steps S204, the tracking unit 120 determines whether or not the object-specific loop process is to be finished at the last end (step S205) of the object-specific loop process. For example, based on whether or not the processes in steps S203 and S204 have been performed on all objects being tracked, the tracking unit 120 determines whether or not the object-specific loop process is to be finished. An object on which the processes in steps S203 and S204 have not been performed exists in the objects being tracked, the tracking unit 120 determines that the object-specific loop process is not to be finished and continues the object-specific loop process.

On the other hand, when the processes in steps S203 and S204 have been performed on all objects being tracked, the tracking unit 120 determines that the object-specific loop process is to be finished and finishes the object-specific loop process.

After finishing the object-specific loop process (steps S202 to S205), the tracking unit 120 performs a process (step S206) for detecting an object to be newly tracked from the frames included in the set of frames to be processed. When there is no object being tracked at the time of starting the object tracking process (NO in step S201), the tracking unit 120 omits the object-specific loop process (steps S202 to S205) and performs the process in steps S206.

In the process in steps S206, in accordance with the known detection method, the tracking unit 120 detects an object to be newly tracked. For example, after detecting, from the frames, an object that satisfies a condition for each object to be tracked, the tracking unit 120 determines whether or not the detected object is the object being tracked, based on the position and a feature of the detected object. When the in-frame position of the detected object generally matches the position from which the object being tracked was detected or the movement destination of the object being tracked, the movement destination being predicted in the prediction process (step S4) performed on the previous set of frames, the possibility that the detected object is the object being tracked is high. Also, when the feature of the detected object generally matches the feature of the object being tracked, the possibility that the detected object is the object being tracked is high. Thus, the tracking unit 120 determines that, for example, an object that is included in objects detected from the frames and whose possibility of being the object being tracked is smaller than or equal to a threshold is a new object to be tracked. The tracking unit 120 adds the feature of the object to be newly tracked to the object feature information 193 and adds the in-frame position of the object to the object position information 194.

When there is no object being tracked at the time of starting the object tracking process that is currently performed, the tracking unit 120 sets all objects detected in the process in step S206 as new objects to be tracked.

Next, the tracking unit 120 calculates the three-dimensional position of each object to be tracked (step S207). In step S207, the tracking unit 120 calculates, for each object to be tracked, the three-dimensional position of the object in real space, based on a relationship between the two-dimensional position of the object in each of the frames and the field of view of each of the cameras that captured the respective frames. The frames in this case are assumed to be frames that are included in all the frames currently processed and that were used to track the object (that is, the frames from which the object was detected in step S204). The tracking unit 120 uses, for example, the visual volume intersection method to calculate the real-space three-dimensional position of the object to be tracked.

After finishing the process in steps S207, the tracking unit 120 finishes the object tracking process performed on the set of frames that is currently processed by using the priority camera information 195.

As described above, in the object tracking process in the present embodiment, the cameras with which the detection difficulty degrees $D_{CP}$ for an object to be tracked are low are selected from the plurality of cameras 2, and the object to be tracked is detected from frames captured by the selected cameras and is tracked. Each detection difficulty degree $D_{CP}$ is a value indicating a degree of difficulty in detecting an object from a corresponding frame, and the difficulty in detecting an object increases as the value of the detection difficulty degree $D_{CP}$ increases. In the present embodiment, each detection difficulty degree $D_{CP}$ represents the degree of influence (a backside influence degree $D_{BG}$) that a second object that overlaps, in a frame, a first object to be tracked at the back side of the first object has on the detection accuracy for detecting the first object. The detection difficulty degrees $D_{CP}$ are updated in the priority-camera information update process (step S5).

The priority-camera information update process (step S5) is performed by the priority-camera determination unit 140 in the object tracking apparatus 1, as described above. The priority-camera determination unit 140 performs, for example, the process according to the flowchart in FIG. 6 as the priority-camera information update process.

Figure 6:
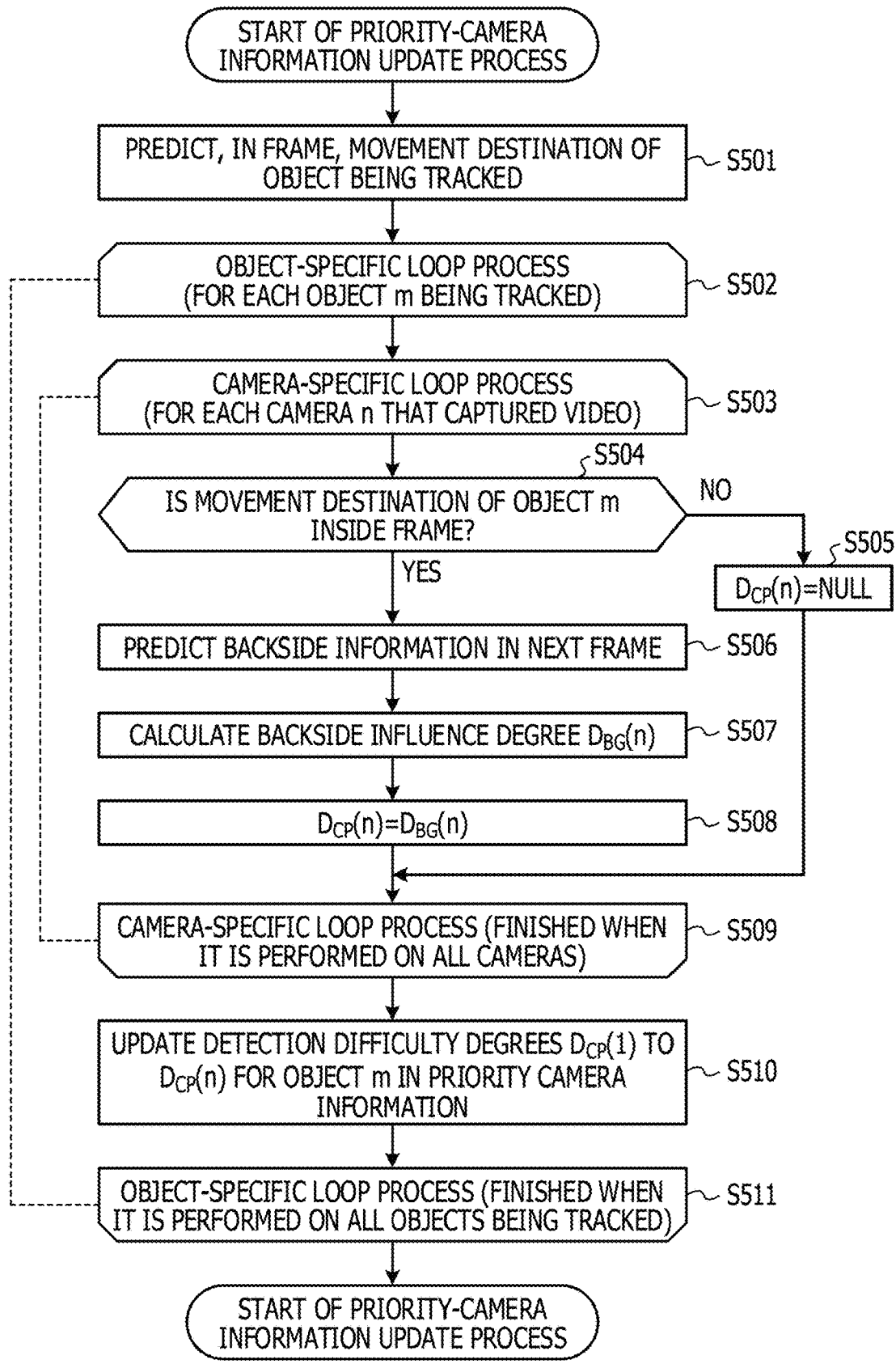
FIG. 6 is a flowchart illustrating details of a priority-camera information update process in the first embodiment.

FIG. 6 is a flowchart illustrating details of the priority-camera information update process in the first embodiment.

As illustrated in FIG. 6, the priority-camera determination unit 140 predicts, for each frame, the movement destination of the object being tracked (step S501). The process in steps 501 is performed by the two-dimensional-position calculating unit 141 included in the priority-camera determination unit 140. Based on a relationship between a prediction result of the three-dimensional position of the object being tracked at the image-capture time point of a next frame and the field of view of the corresponding camera, the two-dimensional-position calculating unit 141 predicts (calculates) the two-dimensional position of the object in a frame plane at the image-capture time point of the next frame. The frame plane in this case is a plane including a projection plane (frame plane) set in real space based on the field of view of the corresponding camera and the focal distance thereof. The two-dimensional position in the frame plane is a position with respect to two-dimensional coordinates indicating a position in a projection plane (in a frame).

The two-dimensional-position calculating unit 141 calculates, for example, for each frame included in a set of frames, a two-dimensional position obtained when an object to be tracked is projected onto a frame plane corresponding to the frame. In this case, the two-dimensional position of an object whose three-dimensional position is outside of the frame (that is, outside of the field of view of the camera) has a value outside a range indicating two-dimensional positions in the frame.

Next, the priority-camera determination unit 140 performs, for each object being tracked, the object-specific loop process (steps S502 to S511) for calculating detection difficulty degrees for detecting the object from respective next frames in pieces of video and for updating the priority camera information 195. For example, at the starting end (step S502) of the object-specific loop process, the priority-camera determination unit 140 selects one object m included in M objects being tracked and specified by a variable m. For example, at the last end (step S511) of the object-specific loop process, the priority-camera determination unit 140 determines whether or not the process has been performed on all objects being tracked. When there is an object on which the process has not been performed, the priority-camera determination unit 140 continues the object-specific loop process. When the process has been performed on all objects being tracked, the priority-camera determination unit 140 finishes the object-specific loop process.

After selecting the object at the starting end of the object-specific loop process, the priority-camera determination unit 140 performs, for each camera 2, the camera-specific loop process (steps S503 to S509) for calculating a detection difficulty degree $D_{CP}(n)$ for the object m in a next frame captured by the camera. At the starting end (step S503) of the camera-specific loop process, the priority-camera determination unit 140 selects one camera n specified by a variable n from N cameras 2. At the last end (step S509) of the camera-specific loop process, the priority-camera determination unit 140 determines whether or not the process has been performed on all the cameras. When there is a camera on which the process has not been performed, the priority-camera determination unit 140 continues the camera-specific loop process. When the process has been performed on all the cameras, the priority-camera determination unit 140 finishes the camera-specific loop process.

After selecting the camera n at the starting end (step S503) of the camera-specific loop process, the priority-camera determination unit 140 determines whether or not the movement destination of the selected object m is inside the frame in video captured by the camera n (step S504). The process in steps S504 is performed by, for example, the detection-difficulty-degree estimating unit 142 included in the priority-camera determination unit 140. When the movement destination of the object m is outside the frame (NO in step S504), the detection-difficulty-degree estimating unit 142 determines that the detection difficulty degree $D_{CP}(n)$ for detecting the object m from the next frame in the video captured by the camera n has an invalid value (for example, a null value) (step S505). On the other hand, when the movement destination of the object m is inside the frame (YES in step S504), the detection-difficulty-degree estimating unit 142 performs a process (steps S506 to S508) for calculating a detection difficulty degree $D_{CP}(n)$ based on the backside information at the movement destination of the object m.

For calculating the detection difficulty degree $D_{CP}(n)$ based on the backside information, the detection-difficulty-degree estimating unit 142 first predicts backside information in the next frame (step S506). The process in steps S506 is performed by, for example, the backside-information obtaining unit 142a included in the detection-difficulty-degree estimating unit 142. Based on the background information 192, the object position information 194, and the object feature information 193, the backside-information obtaining unit 142a obtains, in the next frame in the video captured by the camera n, a feature of a partial region of a background and another object that exist at the back side of the object m, the partial region being located in the surroundings of the object m in the frame.

Based on the prediction result of the backside information, the detection-difficulty-degree estimating unit 142 calculates a backside influence degree $D_{BG}(n)$ for detecting the object m from the next frame in the video captured by the camera n (step S507). The process in steps S507 is performed by, for example, the backside-influence-degree calculating unit 142b included in the detection-difficulty-degree estimating unit 142. The backside-influence-degree calculating unit 142b calculates the backside influence degree $D_{BG}(n)$, for example, based on a degree of similarity between a feature of the object m and the feature of the partial region of the background and the other object that exist at the back side of the object m at the movement destination of the object m, the partial region being located in the surroundings of the object m in the frame. For example, when the degree of similarity is calculated using a mathematical formula with which the degree of similarity increases as the similarity between the feature of the partial region and the feature of the object m increases, the backside-influence-degree calculating unit 142b sets, for example, the calculated degree of similarity as the backside influence degree $D_{BG}(n)$. When the degree of similarity is calculated using a mathematical formula with which the degree of similarity decreases as the similarity between the feature of the partial region and the feature of the object m increases, the backside-influence-degree calculating unit 142b sets, for example, the reciprocal of the calculated degree of similarity as the backside influence degree $D_{BG}(n)$.

After step S507, based on the calculated backside influence degree $D_{BG}(n)$, the detection-difficulty-degree estimating unit 142 calculates the detection difficulty degree $D_{CP}(n)$ for detecting the object m from the next frame from the video captured by the camera n (step S508). The process in steps S508 is performed by the difficulty-degree calculating unit 142c included in the detection-difficulty-degree estimating unit 142. The difficulty-degree calculating unit 142c in the object tracking apparatus 1 in the present embodiment sets the backside influence degree $D_{BG}(n)$ as the detection difficulty degree $D_{CP}(n)$.

Upon finishing the process in step S505 or the processes in steps S506 to S508, the detection-difficulty-degree estimating unit 142 determines whether or not there is a camera for which the detection difficulty degree $D_{CP}(n)$ has not been determined (step S509). When there is a camera for which the detection difficulty degree $D_{CP}(n)$ has not been determined, the detection-difficulty-degree estimating unit 142 continues the camera-specific loop process. When the detection difficulty degrees $D_{CP}(n)$ for all the cameras are determined, the detection-difficulty-degree estimating unit 142 finishes the camera-specific loop process.

After finishing the camera-specific loop process, the detection-difficulty-degree estimating unit 142 updates the detection difficulty degrees $D_{CP}(1)$ to $D_{CP}(N)$ for the object m in the priority camera information 195 (step S510). The process in steps S510 is performed by the updating unit 143 included in the priority-camera determination unit 140.

After finishing the process in step S510, the priority-camera determination unit 140 determines whether or not an object for which the detection difficulty degrees $D_{CP}(1)$ to $D_{CP}(N)$ in the priority camera information 195 have not been updated exists in the objects being tracked (step S511). When there is an object for which the detection difficulty degrees $D_{CP}(1)$ to $D_{CP}(N)$ have not been updated, the priority-camera determination unit 140 continues the object-specific loop process. When the detection difficulty degrees $D_{CP}(1)$ to $D_{CP}(N)$ for all the objects have been updated, the priority-camera determination unit 140 finishes the object-specific loop process and ends the priority-camera information update process.

As described above, in the priority-camera information update process, the detection difficulty degree $D_{CP}$ for an object being tracked is calculated based on the prediction result of the degree of similarity between the object being tracked and a background and another object that exist at the back side of the object being tracked, the objects and the background being shown in a frame captured next to the frame that is currently processed. In the priority-camera determination process, the detection difficulty degree $D_{CP}$ in the priority camera information 195 is updated to the calculated detection difficulty degree $D_{CP}$. Thus, during the object tracking process (step S2) using the set of next frames, it is possible to select frames in which the degree of similarity between the object being tracked and another object that exists at the back side of that object being tracked is low, and it is possible to detect and track the object. This allows the object tracking apparatus 1 in the present embodiment to perform high-accuracy searching of an object being tracked.

Figure 7:
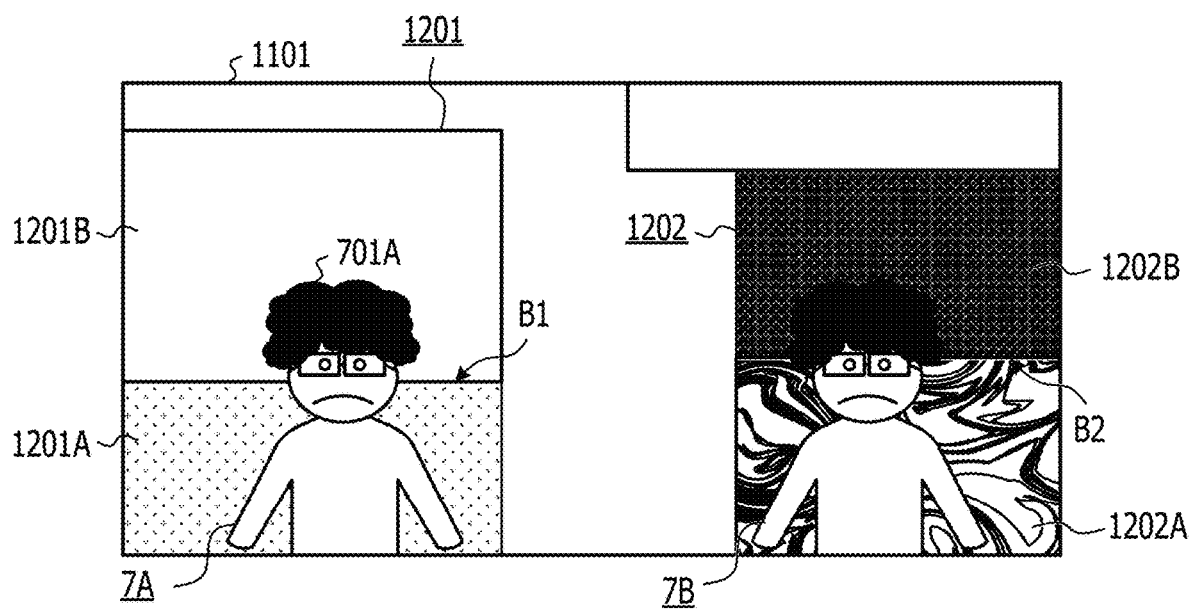
FIG. 7 is a diagram illustrating an influence that a background has on object detection.

FIG. 7 is a view illustrating an influence that a background has on object detection.

An image 1101 illustrated in FIG. 7 shows two people 7A and 7B who appear to be generally identical.

A first object 1201 exists at the back side of the left person 7A of the two people 7A and 7B shown in the image 1101. The first object 1201 has a lower portion 1201A whose boundary is a boundary line B1 extending horizontally at a height position that is close to a center in an up-and-down direction of a head 701A of the person 7A and an upper portion 1201B whose boundary is the boundary line B1, and the color of the lower portion 1201A and the color of the upper portion 1201B differ from each other. For example, it is assumed that the upper portion 1201B of the first object 1201 is white, and the lower portion 1201A has high-brightness color other than white.

On the other hand, a second object 1202 exists at the back side of the right person 7B of the two people 7A and 7B shown in the image 1101. The second object 1202 has a lower portion 1202A whose boundary is a boundary line B2 extending horizontally at a height position that is close to a center in the up-and-down direction of a head 701B of the person 7B and an upper portion 1202B whose boundary is the boundary line B2. The color of the lower portion 1202A and the color of the upper portion 1202B differ from each other. For example, it is assumed that the upper portion 1202B of the second object 1202 has color close to low-brightness black, and the lower portion 1202A has a marble pattern in intermediate color.

When objects to be tracked are human heads, the object tracking apparatus 1 first detects the human heads 701A and 701B from the image 1101. During the detection, the object tracking apparatus 1 applies, for example, a known edge detection method or the like to detect the human heads 701A and 701B from the image 1101.

A detection accuracy for detecting each human head from the image 1101 by using edge detection varies depending on the degree of similarity between an in-image feature of the human head and an in-image feature (such as color and brightness) of another object (a background) that exists at the back side of the head and in the surroundings of the head. For example, when the degree of similarity between the in-image feature of a human head and the in-image feature of another object is low, edges are distinct, and the feature of the human head is not obscured, thus making it easy to detect the head of a person, and the detection accuracy is high. On the other hand, when the degree of similarity between the in-image feature of a human head and the in-image feature of another object is high, edges disappear, and the feature of the human head is obscured, thus making it difficult to detect the head of a person and reducing the detection accuracy.

When information indicating color is used as the feature of a human head in video, for example, in many cases, the feature of the upper half of the human head is low-brightness color that is close to black, and the feature of the lower half of the human head is high-brightness color, such as skin color. Thus, when the human head 701A is to be detected from the image 1101 in FIG. 7, the degree of similarity between the feature of the head 701A and the feature of the first object 1201 in the surroundings of the head 701A is low. Accordingly, when the human heads are to be detected from the image 1101 in FIG. 7, it is possible to easily detect the head 701A of the left person 7A, and the detection accuracy is also high. In contrast, when the human head 701B is to be detected from the image 1101 in FIG. 7, the degree of similarity between the feature of the head 701B and the feature of the second object 1202 in the surroundings of the head 701B is high. Accordingly, when the human heads are to be detected from the image 1101 in FIG. 7, it is difficult to correctly detect the head 701B of the right person 7B, and the detection accuracy decreases. Hence, as described above, the object tracking apparatus 1 in the present embodiment selects a frame with which the detection difficulty degree $D_{CP}$ is low from a plurality of frames, detects an object to be tracked from the selected frame, and calculates the three-dimensional position of the object based on the detection result. For example, for detecting the left person 7A from a set of frames including the image (frame) 1101 and tracking the left person 7A, the object tracking apparatus 1 in the present embodiment uses the image 1101 to detect the left person 7A, and for detecting the right person 7B and tracking the right person 7B, the object tracking apparatus 1 does not use the image 1101 to detect the person 7B. This allows the object tracking apparatus 1 in the present embodiment to detect an object being tracked from a frame with which the detection accuracy is high, thus making it possible to improve the tracking accuracy.

When the number of objects to be tracked is two or more, like the people 7A to 7E and 8A to 8E in the object tracking system in FIG. 2, there are cases in which video captured by one camera includes a frame in which the two or more objects to be tracked overlap each other in a depth direction. When one portion of an entire object is to be detected as an object to be tracked, another portion (an accompanying portion) of the entire object also moves in the video in conjunction with the portion detected as a tracking target of the entire object. Thus, when the movement destination of one object in one frame is predicted to calculate a backside influence degree $D_{BG}$, a portion that accompanies another object to be tracked may exist between that object and an object (background) not to be tracked, such as a floor or building. For example, during detection of the head of a person from video as an object to be tracked, a portion (an accompanying portion) below his or her neck moves in the video in conjunction with the head to be tracked. Thus, there are cases in which another object that overlaps the head of a first person at the back side of the head in the video is a portion (an accompanying portion) that is below the neck of a second person, regardless of whether the other overlapping object is an object (background) not to be tracked or the head of the second person. Accordingly, the object tracking apparatus 1 in the present embodiment calculates the backside influence degree $D_{BG}$, considering an in-video feature of a portion that accompanies an object to be tracked.

Figure 8A:
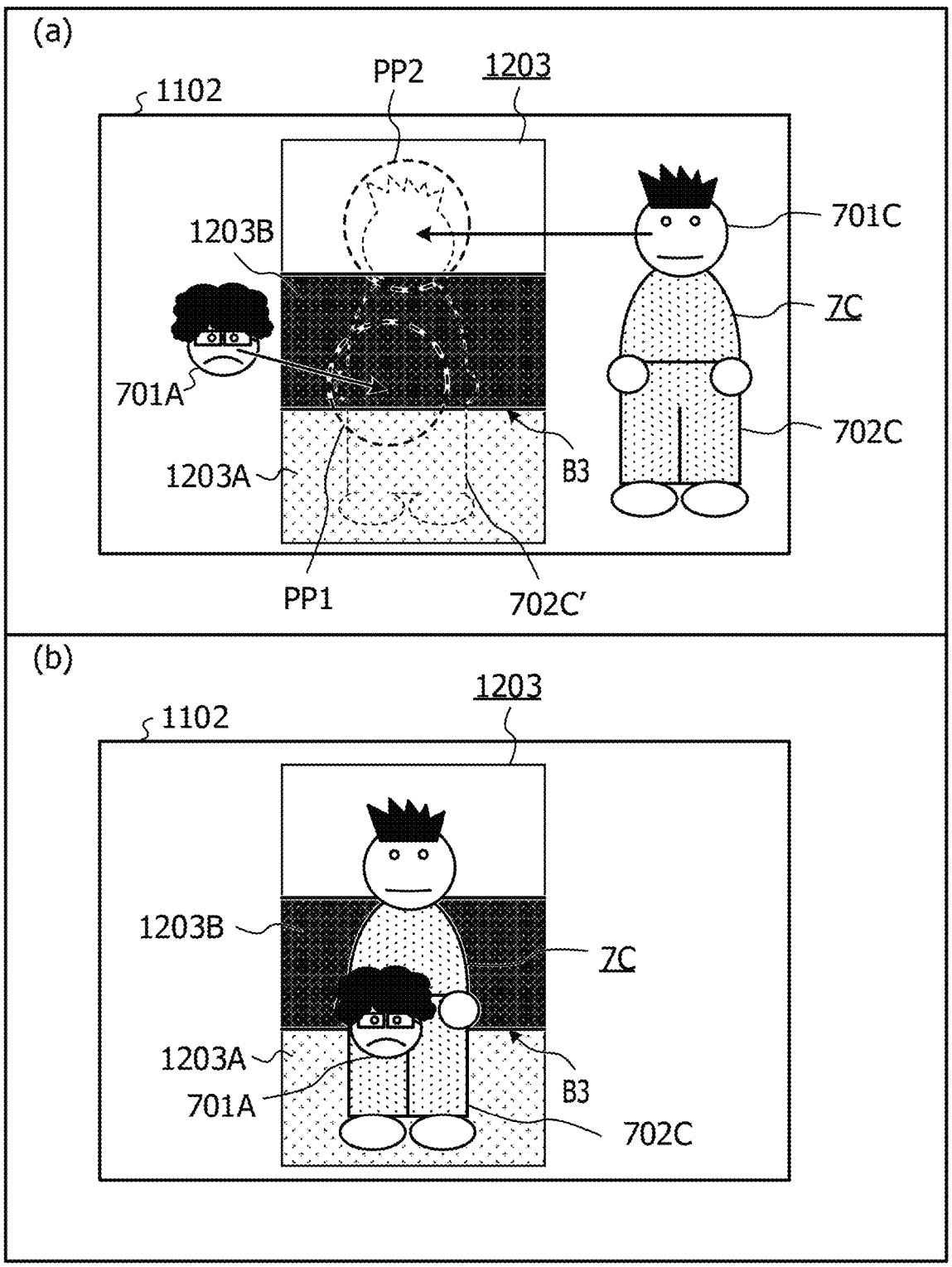
FIG. 8A is a view (part 1) illustrating an influence that an accompanying portion has on object detection.
Figure 8B:
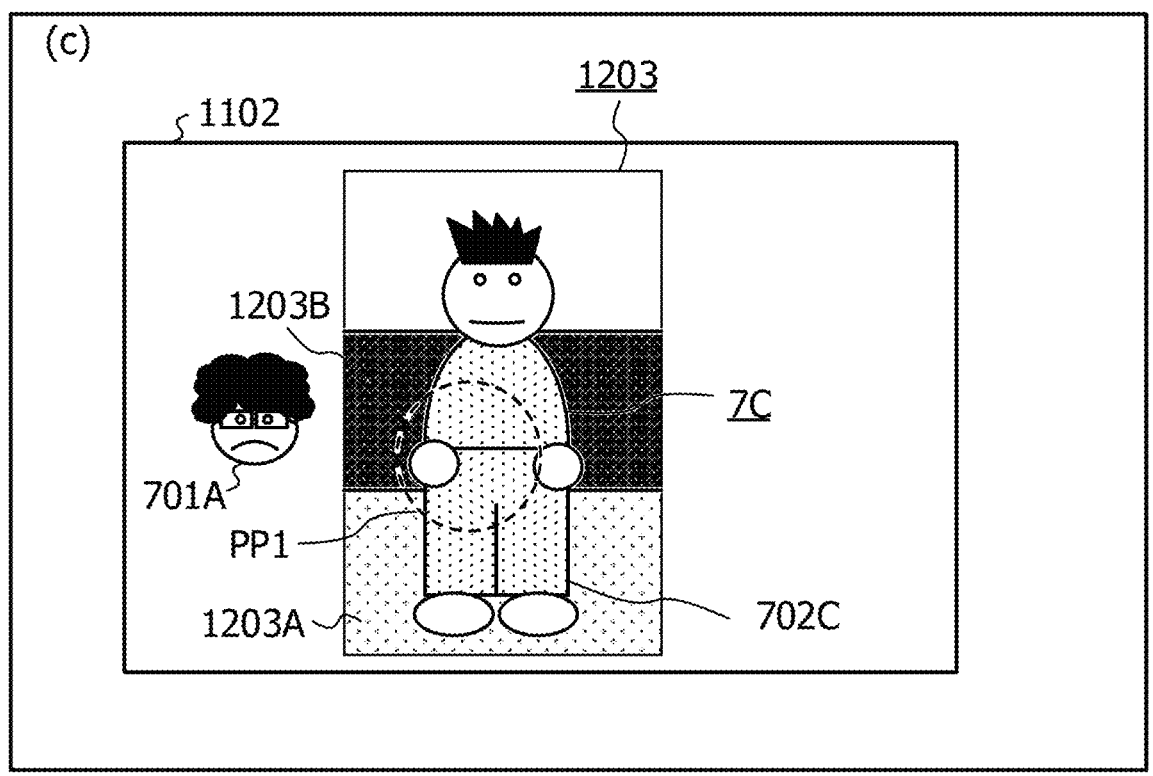
FIG. 8B is a view (part 2) illustrating the influence that the accompanying portion has on object detection.

FIG. 8A is a view (part 1) illustrating an influence that an accompanying portion has on object detection. FIG. 8B is a view (part 2) illustrating the influence that the accompanying portion has on object detection.

In FIG. 8A, (a) illustrates a frame (image) 1102 at time point tin video captured by one camera. When a first head 701A and a second head 701C in the frame 1102 are objects being tracked, the object tracking apparatus 1 predicts the three-dimensional positions of the first head 701A and the second head 701C at time point t+Δt (step S4). Thereafter, the object tracking apparatus 1 performs the priority-camera information update process (step S5).

In the priority-camera information update process, first, based on the predicted three-dimensional positions, the object tracking apparatus 1 calculates the two-dimensional positions of the first head 701A and the second head 701C in a frame at the image-capture time point of a next frame (a frame at time point t+Δt) (step S501). Thereafter, the object tracking apparatus 1 performs, for each object being tracked, the object-specific loop process (steps S502 to S508) for calculating the detection difficulty degrees $D_{CP}$ in respective next frames captured by the respective cameras and updating the priority camera information 195.

The two-dimensional positions of the first head 701A and the second head 701C in a next frame in the video including the frame 1102 in (a) in FIG. 8A are assumed to be a first position PP1 and a second position PP2, respectively, denoted by dotted-line circles in the frame 1102. The first position PP1 in the frame 1102 includes a first portion 1203A and a second portion 1203B, which are included in an object (background) 1203 not to be tracked and are separated by a boundary line B3 extending in a horizontal direction. Thus, when a case in which the objects to be tracked are human heads, and only the movement destinations of the human heads are considered, backside information at the movement destination of the first head 701A is information including features of the surroundings of a region that overlaps the first position PP1 on the object 1203.

However, when the objects to be tracked are human heads, and the second head 701C is assumed to be at the second position PP2, an accompanying portion 702C that accompanies the second head 701C moves to below the second position PP2. Thus, the first position PP1 in the frame 1102 overlaps an accompanying portion 702C' of the second head 701C. In this case, it is assumed that the prediction result of the three-dimensional positions of the first head 701A and the second head 701C indicates that the second head 701C is farther (more backward) than the first head 701A when viewed from a camera that captures the video including the frame 1102. In this case, in the next frame, the accompanying portion 702C of the second head 701C exists at the back side of the first head 701A and between the first head 701A and the object (background) 1203, as in a frame 1102 in (b) in FIG. 8A. Thus, the object tracking apparatus 1 estimates, for example, a feature of the first position PP1 in a state in which the second head 701C and the accompanying portion 702C are superimposed on the background, as in the frame 1102 in (c) in FIG. 8B. Based on the similarity between the feature of the first position PP1 and the feature of the first head 701A, the object tracking apparatus 1 calculates a backside influence degree $D_{BG}$ for detecting the first head 701A from the next frame.

The backside influence degree $D_{BG}$ when an accompanying portion of another object overlaps at the back side of an object to be tracked in a next frame may increase owing to the overlapping of the accompanying portion or may decrease owing to the overlapping of the accompanying portion.

Figure 9:
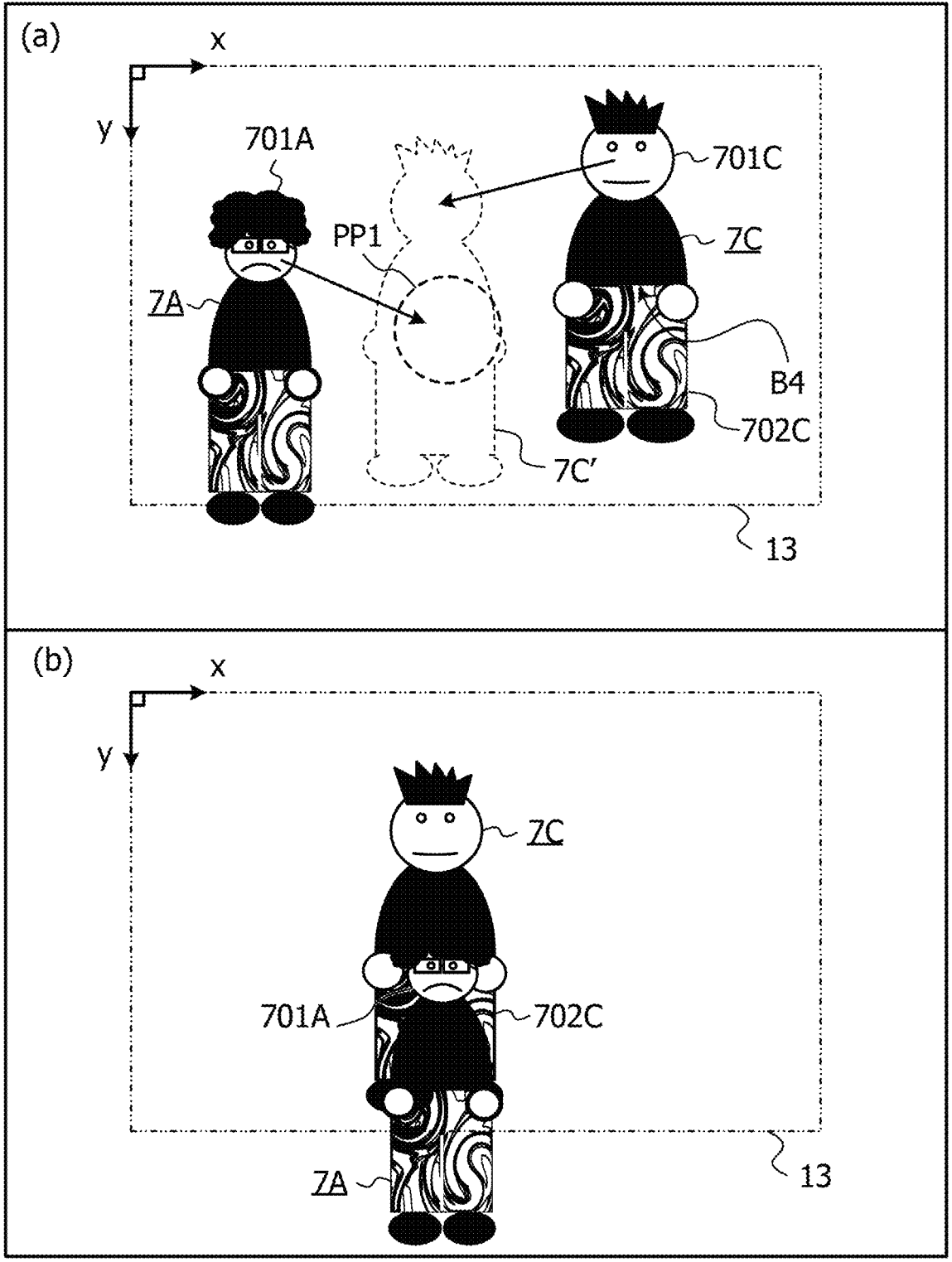
FIG. 9 is a view illustrating an example in which a backside influence degree increases owing to an accompanying portion.

FIG. 9 is a view illustrating an example in which the backside influence degree increases owing to an accompanying portion.

In FIG. 9, (a) indicates a positional relationship between the field of view (image-capture range) 13 of a camera and two people 7A and 7B at time point t. In this case, when objects to be tracked are human heads, a first head 701A and a second head 701C are detected from a frame at time point tin video captured by the camera. A first circle PP1 in the field of view 13 of the camera, the first circle PP1 being illustrated in (a) in FIG. 9, indicates the position of the first head 701A in a next frame, the position being predicted by the object tracking apparatus 1.

The first circle PP1 and its surroundings in the background (for example, a floor or a wall of a building) in the field of view 13 of the camera are plain. Thus, the similarity between a feature of the first circle PP1 and its surroundings in the frame at time point t in the video captured by the camera and a feature of the first head 701A in the frame is low.

However, when the position of a person 7C in the next frame, the position being based on a prediction result of the movement destination of the second head 701C, is assumed to be a position 7C' indicated by a dotted line in (a) in FIG. 9, the first circle PP1 overlaps the accompanying portion 702C of the person 7C. In this case, when the position of the person 7C in the next frame is assumed to be at the back side of the position of the person 7A, the positional relationship of the two people 7C and 7A in the field of view 13 at the image-capture time point of the next frame is a relationship as illustrated in (b) in FIG. 9. Accordingly, when a detection difficulty degree $D_{CP}$ for detecting the first head 701A from the next frame is to be calculated, the feature of the accompanying portion 702C of the person 7C which exists at the back side of the first head 701A is considered. The person 7C in FIG. 9 wears a black shirt and trousers with a marble pattern. That is, the feature of the accompanying portion 702C in the frame including the person 7C include information indicating that a portion above a boundary line B4 extending in the horizontal direction at a height position that is generally center in the up-and-down direction of the accompanying portion 702C is black, and a portion below the boundary line B4 has a marble pattern. Thus, as in (b) in FIG. 9, when the accompanying portion 702C of the person 7C overlaps at the back side of the first head 701A, the degree of similarity between the feature of the first head 701A and the feature of the surroundings of the first head 701A increases. Hence, in the example illustrated in FIG. 9, since the accompanying portion 702C overlaps at the back side of the first head 701A, the backside influence degree $D_{BG}$ increases, compared with a case in which the accompanying portion 702C does not overlap.

Figure 10:
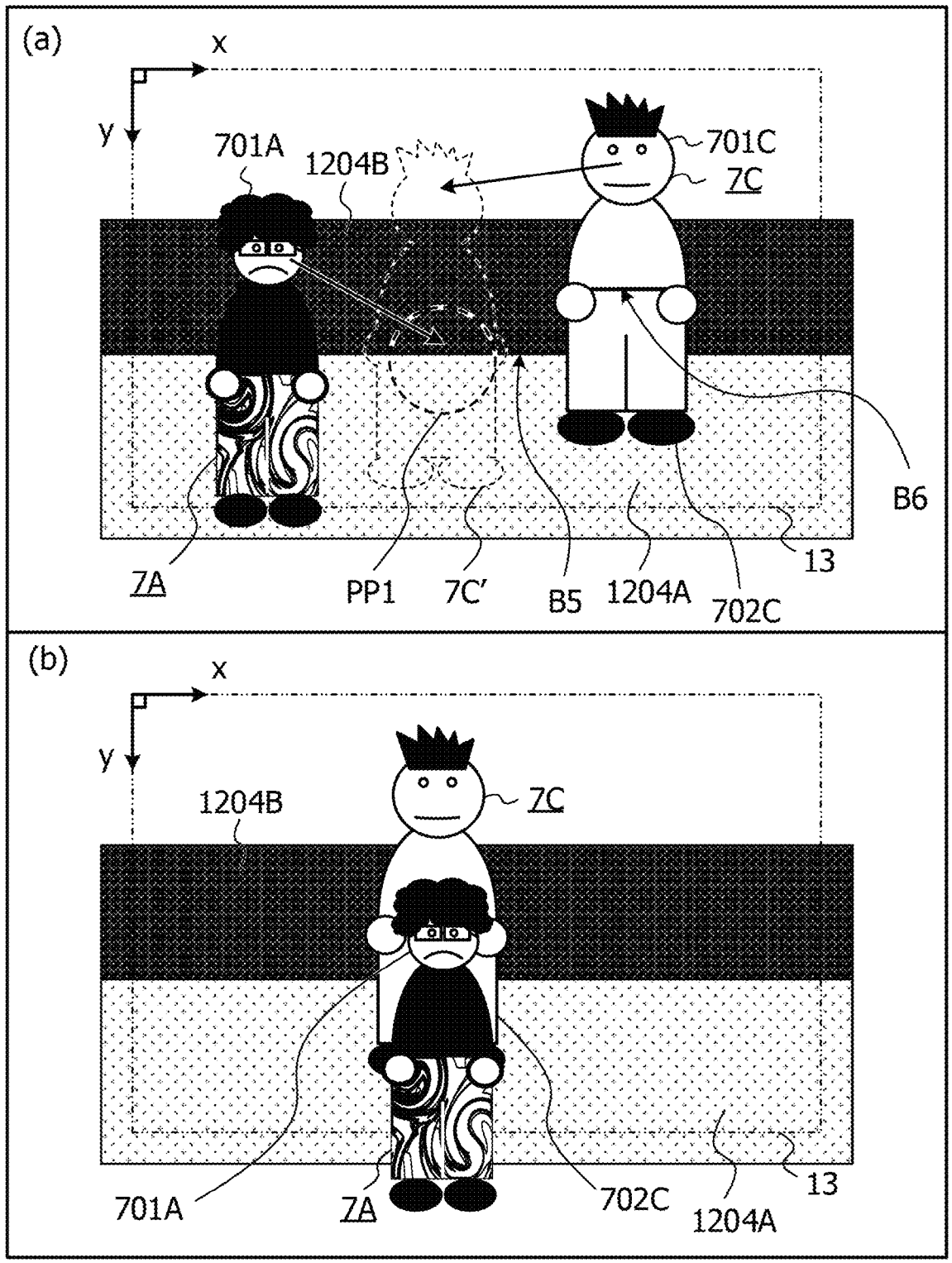
FIG. 10 is a view illustrating an example in which the backside influence degree decreases owing to an accompanying portion.

FIG. 10 is a view illustrating an example in which the backside influence degree decreases owing to an accompanying portion.

In FIG. 10, (a) indicates a positional relationship between the field of view (image-capture range) 13 of a camera and two people 7A and 7B at time point t. In this case, when objects to be tracked are human heads, a first head 701A and a second head 701C are detected from a frame at time point tin video captured by a camera. A first circle PP1 in the field of view 13 of the camera in (a) in FIG. 10 indicates the position of the first head 701A in a next frame, the position being predicted by the object tracking apparatus 1.

In the first circle PP1 and its surroundings in the background (for example, a floor or a wall of a building) in the field of view 13 of the camera, a portion below a boundary line B5 is a high-brightness portion 1204A, and a portion above the boundary line B5 is a portion 1204B whose color is close to black. Thus, the similarity between a feature of the first circle PP1 and its surroundings in the frame at time point t in the video captured by the camera and a feature of the first head 701A in the frame is high.

However, when the position of the person 7C in a next frame, the position being based on a prediction result of the movement destination of the second head 701C, is assumed to be a position 7C' indicated by a dotted line in (a) in FIG. 10, the first circle PP1 overlaps the accompanying portion 702C of the person 7C. In this case, when the position of the person 7C in the next frame is assumed to be at the back side of the position of the person 7A, the positional relationship between the two people 7C and 7A in the field of view 13 at the image-capture time point of the next frame is a relationship as illustrated in (b) in FIG. 10. Accordingly, when a detection difficulty degree $D_{CP}$ for detecting the first head 701A from the next frame is calculated, the feature of the accompanying portion 702C of the person 7C which exists at the back side of the first head 701A is considered. The person 7C in FIG. 10 wears a white shirt and trousers with high-brightness color other than white. That is, the feature of the accompanying portion 702C in the frame including the person 7C include information indicating that a portion above a boundary line B6 extending in the horizontal direction at a height position that is generally center in the up-and-down direction of the accompanying portion 702C is white, and a portion below the boundary line B6 has high-brightness color other than white. Thus, when the accompanying portion 702C of the person 7C overlaps at the back side of the first head 701A, as in (b) in FIG. 10, the degree of similarity between the feature of the first head 701A and the feature of the surroundings of the first head 701A decreases. Hence, in the example illustrated in FIG. 10, since the accompanying portion 702C overlaps at the back side of the first head 701A, the backside influence degree $D_{BG}$ decreases, compared with a case in which the accompanying portion 702C does not overlap.

As described above, the similarity between the feature of an object to be detected and the feature of another object that overlaps at the back side of the object to be detected influences the detection accuracy for detecting the object to be tracked from a next frame. Thus, based on a prediction result of the position of each object in a next frame, the object tracking apparatus 1 in the present embodiment calculates an influence (backside influence degree $D_{BG}$) that the feature of the backside has on the detection accuracy for detecting an object to be tracked from the next frame. Thereafter, during detection of the object being tracked from a set of next frames, the object tracking apparatus 1 selects the frame(s) with which the backside influence degree $D_{BG}$ is low to detect the object being tracked. This allows the object tracking apparatus 1 in the present embodiment to suppress a reduction in the detection accuracy for the object to be tracked. In addition, during detection of an object being tracked from a set of frames captured at a same time point, selecting only the frame(s) with which the backside influence degree $D_{BG}$ is smaller than or equal to a threshold to detect the object to be tracked makes it possible to further suppress a reduction in the detection accuracy of the object to be tracked. Hence, in the object tracking apparatus 1 in the present embodiment, the three-dimensional position of each object to be tracked may be calculated with high accuracy, thus improving the tracking accuracy of the object.

The in-image feature used to calculate the backside influence degree $D_{BG}$ may be any of various features used for detecting or identifying an object in video (images). For example, the in-image feature may be any of a feature about color, a feature about a shape, and a feature about a texture. Examples of the feature about color include a pixel value, a color histogram, and a brightness histogram. Examples of the feature about a shape include a Haar-like feature, a HOG feature, and a SIFT feature. Examples of the feature about a texture include an LBP feature.

The information about an object to be tracked, an accompanying portion, and so on, the information being contained and held in the object feature information 193, may be a histogram, features, or video (a frame) itself.

FIG. 3 illustrates merely an example of the contents of the priority camera information 195. The priority camera information 195 may be any information including information indicating each frame (camera) that the tracking unit 120 preferentially uses in the object tracking process and with which the object detection difficulty degree is low. Thus, for example, when the priority camera information 195 is used for only determining each frame used for object tracking, the priority camera information 195 may include only information indicating each frame used for tracking. For example, when the priority camera information 195 is used for only determining an order of tracking a plurality of objects, the priority camera information 195 may include only information indicating an order of tracking objects.

The object tracking apparatus 1 in the present embodiment may also perform the time-series loop process in FIG. 4 after completing a process for acquiring pieces of video from the respective cameras 2.

The object tracking process according to the flowchart in FIG. 5 is merely an example of the object tracking process using the priority camera information 195. The object tracking process performed by the object tracking apparatus 1 in the present embodiment is not limited to the process according to the flowchart in FIG. 5 and may be modified as appropriate. For example, the object tracking process may be a process in which, for each of all objects being tracked, the cameras used to detect the object are selected based on the priority camera information 195, and then the object is detected from frames captured by the cameras selected for the object.

The object tracking process according to the flowchart in FIG. 6 is merely an example of the object tracking process using the priority camera information 195. The object tracking process using the priority camera information 195 is not limited to the process according to the flowchart in FIG. 6 and may be modified as appropriate. For example, the object tracking process using the priority camera information 195 may be a process according to a flowchart in FIG. 11.

Figure 11:
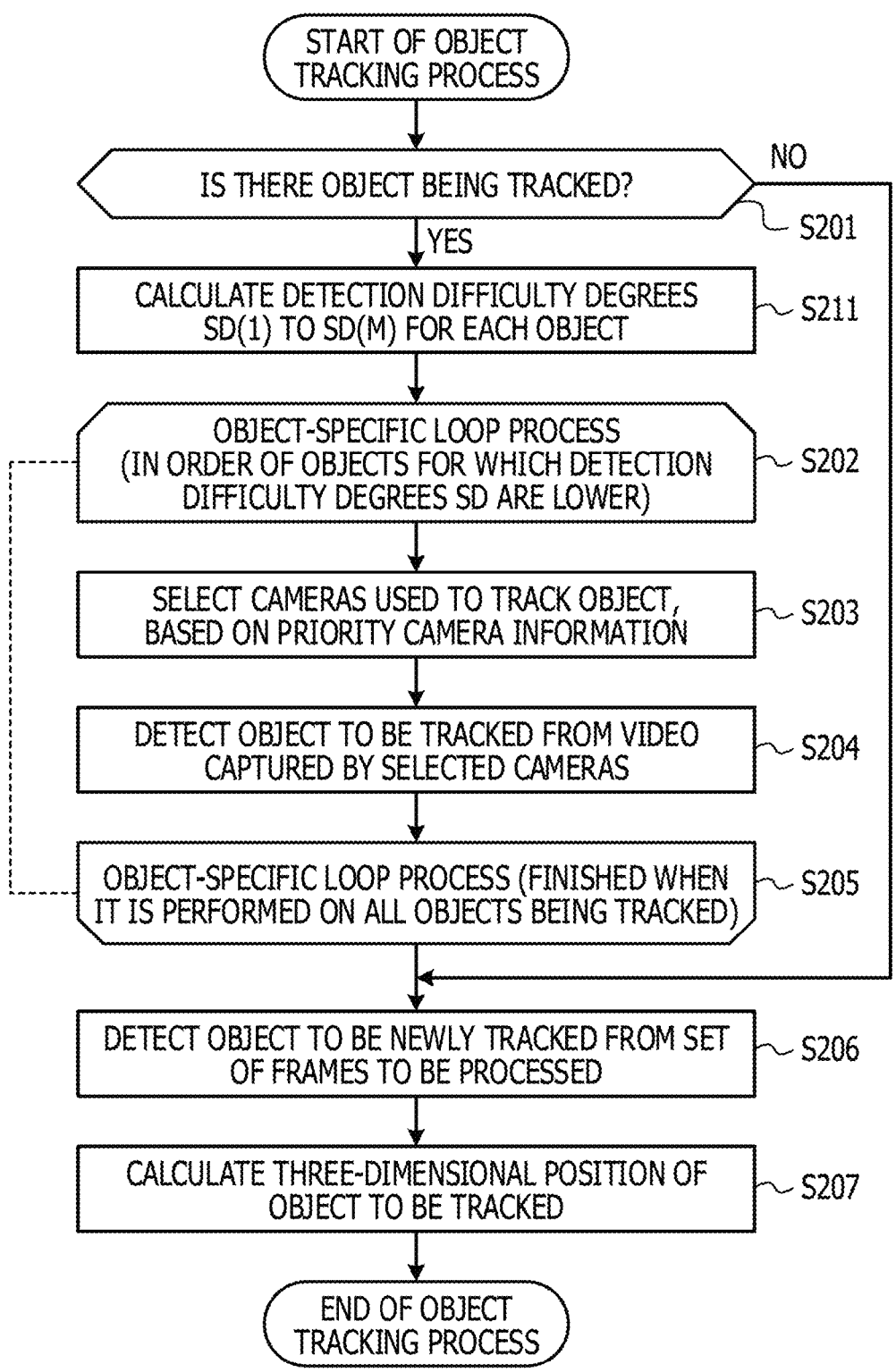
FIG. 11 is a flowchart illustrating another example of details of the object tracking process using the priority camera information.

FIG. 11 is a flowchart illustrating another example of details of the object tracking process using the priority camera information.

For example, the tracking unit 120 in the object tracking apparatus 1 performs the process according to the flowchart in FIG. 11. For example, the tracking unit 120 first determines whether or not there is an object being tracked (step S201). When there is an object being tracked (step S201), the tracking unit 120 performs the object-specific loop process (steps S202 to S205), before which the tracking unit 120 calculates detection difficulty degrees SD(1) to SD(M) for each object, based on the priority camera information 195 (step S211). In a process in steps S211, the tracking unit 120 extracts, for each object being tracked, K detection difficulty degrees in an ascending order of the values of detection difficulty degrees $D_{CP}(1)$ to $D_{CP}(N)$ in the priority camera information 195 and calculates the sum of the extracted K detection difficulty degrees. For example, for K=3, when the detection difficulty degree SD(1) for the object with ID=1 in the priority camera information 195 in FIG. 3 is calculated, SD(1)=9.0 is obtained. Similarly, when the detection difficulty degrees SD(2) to SD(4) for the objects with ID=2 to 4 are calculated, SD(2)=17.8, SD(3)=16.4, and SD(4)=35.6 are obtained.

In the object-specific loop process in the flowchart in FIG. 11, for example, the tracking unit 120 selects objects to be processed at the starting end (step S202) of the object-specific loop process. For the selection, based on the result of the process in steps S211, the tracking unit 120 performs a loop process for selecting the objects in an ascending order of the detection difficulty degrees SD. For example, when four objects with ID=1 to 4 in the priority camera information 195 in FIG. 3 are objects being tracked, the tracking unit 120 performs a process for detecting the objects from frames that are currently processed and tracking the objects in the order of the object with ID=1, the object with ID=3, the object with ID=2, and the object with ID=4. With such processing, for example, during calculation of the three-dimensional position of the object with ID=4 for which the detection difficulty degree is high, it is possible for the tracking unit 120 to perform the calculation so that the three-dimensional position of the object with ID=4 does not overlap the three-dimensional positions of the three objects with ID=1 to 3.

After finishing the object-specific loop process, the tracking unit 120 performs a process for detecting an object to be newly tracked from the set of frames to be processed (step S206) and a process for calculating the three-dimensional position of the object to be tracked (step S207). When there is no object being tracked (NO in step S201) at the time of starting the object tracking process, the tracking unit 120 omits the process in step S211 and the object-specific loop process and performs the processes in steps S206 and S207.

In addition, for performing the object tracking process using the priority camera information 195, the tracking unit 120 may also use the priority camera information 195, for example, in the process (step S207) for calculating the three-dimensional position of the object to be tracked. When the priority camera information 195 is used in the process for calculating the three-dimensional position, for example, the tracking unit 120 may also change a restriction on the positions of an object in frames during calculation of the three-dimensional position of the object, in accordance with the detection difficulty degrees $D_{CP}$.

Figure 12:
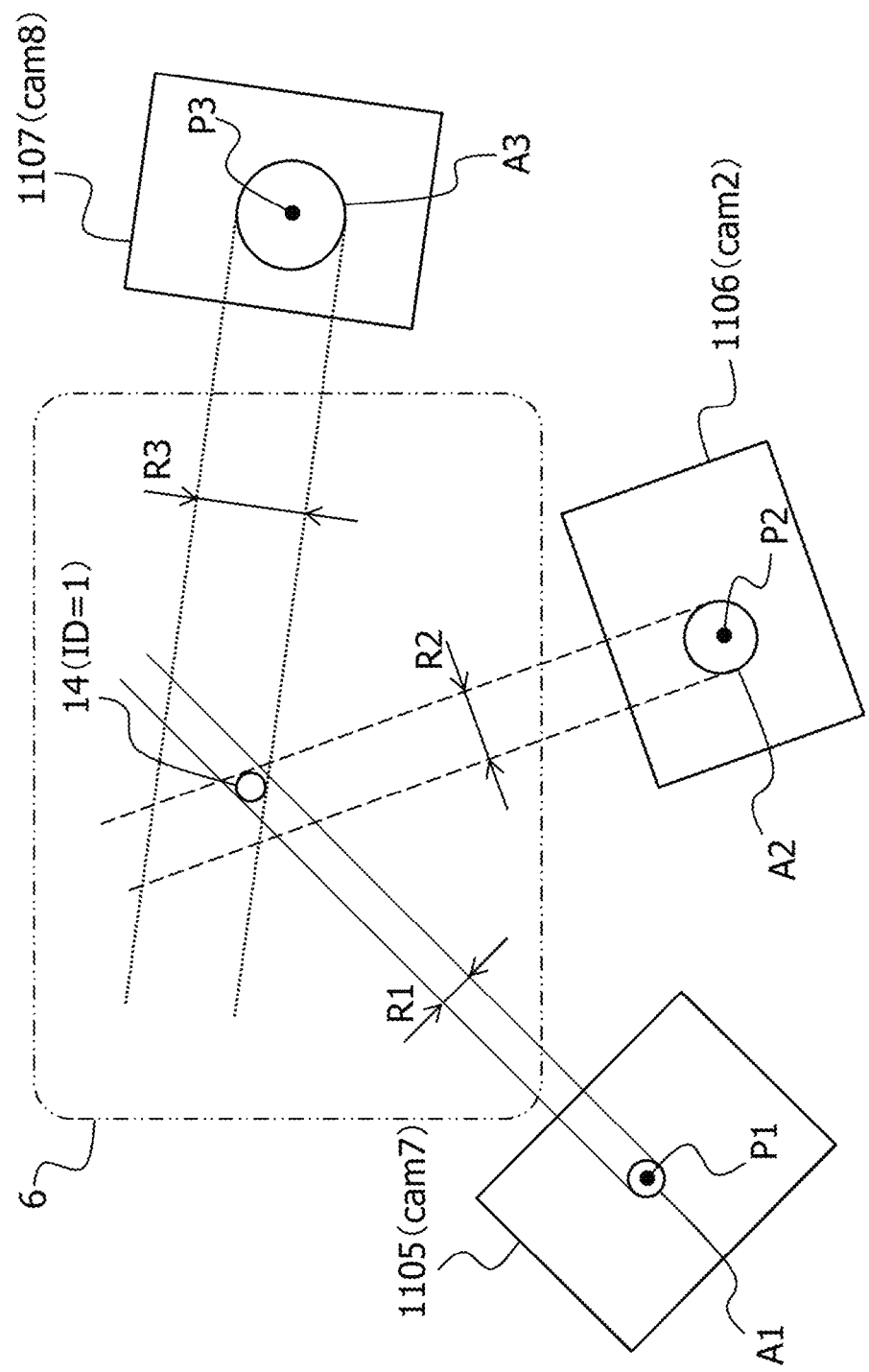
FIG. 12 is a diagram illustrating a method for calculating a three-dimensional position considering the priorities of cameras.

FIG. 12 is a diagram illustrating a method for calculating a three-dimensional position considering the priorities of cameras.

FIG. 12 illustrates three frames 1105 to 1107 captured by respective three cameras that capture images of a real space (the image-capture area 6). The three frames 1105 to 1107 are assumed to be captured by, for example, three cameras corresponding to cam2, cam7, and cam8 in the priority camera information 195 in FIG. 3. In the example illustrated in FIG. 12, the first frame 1105 is a frame captured by the camera cam7, and the second frame 1106 is a frame captured by the camera cam2. In the example illustrated in FIG. 12, the third frame 1107 is a frame captured by the camera cam8.

When the detection difficulty degrees $D_{CP}$ in the priority camera information 195 are regarded as the degrees of reliability of detection positions, the detection position of an object detected from a frame captured by the camera with a lower detection difficulty degree has a higher degree of reliability of the detection position.

The detection difficulty degrees $D_{CP}$ for the object with ID=1 in the priority camera information 195 in FIG. 3 increases in the order of the cameras cam7, cam2, and cam8. For example, when the object with ID=1 is detected from each of the three frames 1105 to 1107 in FIG. 12, the degree of reliability of the detection position in the frame 1105 captured by the camera cam7 is the highest. The frame having the second highest degree of reliability of the detection position of the object with ID=1 is the frame 1106 captured by the camera cam2, and the frame having the third highest degree of reliability of the detection position of the object with ID=1 is the frame 1107 captured by the camera cam8. Thus, when the real-space three-dimensional position of an object 14 is to be calculated based on the detection positions of the object with ID=1 which are detected from the three frames 1105 to 1107, the tracking unit 120 sets position restriction diameters R1 to R3 in the three frames so as to satisfy R1<R2<R3. Each position restriction diameter is information indicating a permissible range of the position of an object, the permissible range being centered on the detection position of the object in the corresponding frame. For example, in the first frame 1105 in FIG. 12, the area in a circle having a diameter R1 and centered on a detection position P1 in the frame 1105 is the permissible range of the position of the object with ID=1. Similarly, in the second the frame 1106 in FIG. 12, the area in a circle having a diameter R2 and centered on a detection position P2 in the frame 1106 is the permissible range of the position of the object with ID=1. In the third frame 1107 in FIG. 12, the area in a circle having a diameter R3 and centered on a detection position P3 in the frame 1107 is the permissible range of the position of the object with ID=1. The position restriction diameter Ri (i=1 to 3) is calculated, for example, using equation (1) below.

$$Ri = (D_{CP}i / AD_{CP}) \times R0 \qquad (1)$$

$AD_{CP}$ in equation (1) is the average value of detection difficulty degrees of all cameras for an object to be detected. R0 in equation (1) is a reference diameter (a constant).

When the three-dimensional position of an object is calculated based on the detection positions of the object in the three frames 1105 to 1107, the tracking unit 120 calculates a logical conjunction (an AND value) obtained when image-capture ranges based on the position restriction diameters R1 to R3 in the respective frames 1105 to 1107 are superimposed in real space.

When an object being tracked is detected from pieces of video (frames) captured by the respective cameras, the size and orientation of the object differs from one frame to another, and the detection difficulty degree differs from one frame to another. Thus, in-frame positions of the object which are detected from the frames have differences corresponding to the outline of the object and the detection difficulty degrees. When a common position restriction diameter is set for the frames without considering the differences, and the three-dimensional position of the object is calculated, the accuracy of the three-dimensional position may decrease. For example, when the common position restriction diameter is larger than an appropriate value in the frame with which the detection difficulty is the lowest, the region where the common position restriction diameters overlap in real space may become larger than an appropriate range to thereby reduce the accuracy of the three-dimensional position of the object. Also, for example, when the common position restriction diameter is smaller than an appropriate value in the frame with which the detection difficulty is the highest, the region where the common position restriction diameters overlap in real space may become smaller than an appropriate range, and thus the three-dimensional position of the object becomes an erroneous position.

In contrast, when the position restriction diameters R1 to R3 corresponding to the detection difficulty degrees are set, the region (the AND region) where the position restriction diameters R1 to R3 overlap each other in real space may be set to an appropriate range corresponding to the degrees of reliability of the detection positions of the object in the respective frames. Hence, setting the position restriction diameters R1 to R3 corresponding to the detection difficulty degrees to calculate the three-dimensional position of the object makes it possible to calculate the three-dimensional position of the object with high accuracy.

An object tracking system to which the object tracking apparatus 1 in the present embodiment is applied is not limited to a system for tracking motions of players (people 7A to 7E and 8A to 8E) in a sports game like that in FIG. 2 and may be modified as appropriate. For example, the object tracking system may be a system for measuring movement paths or flow rates of people in each facility.

Figure 13:
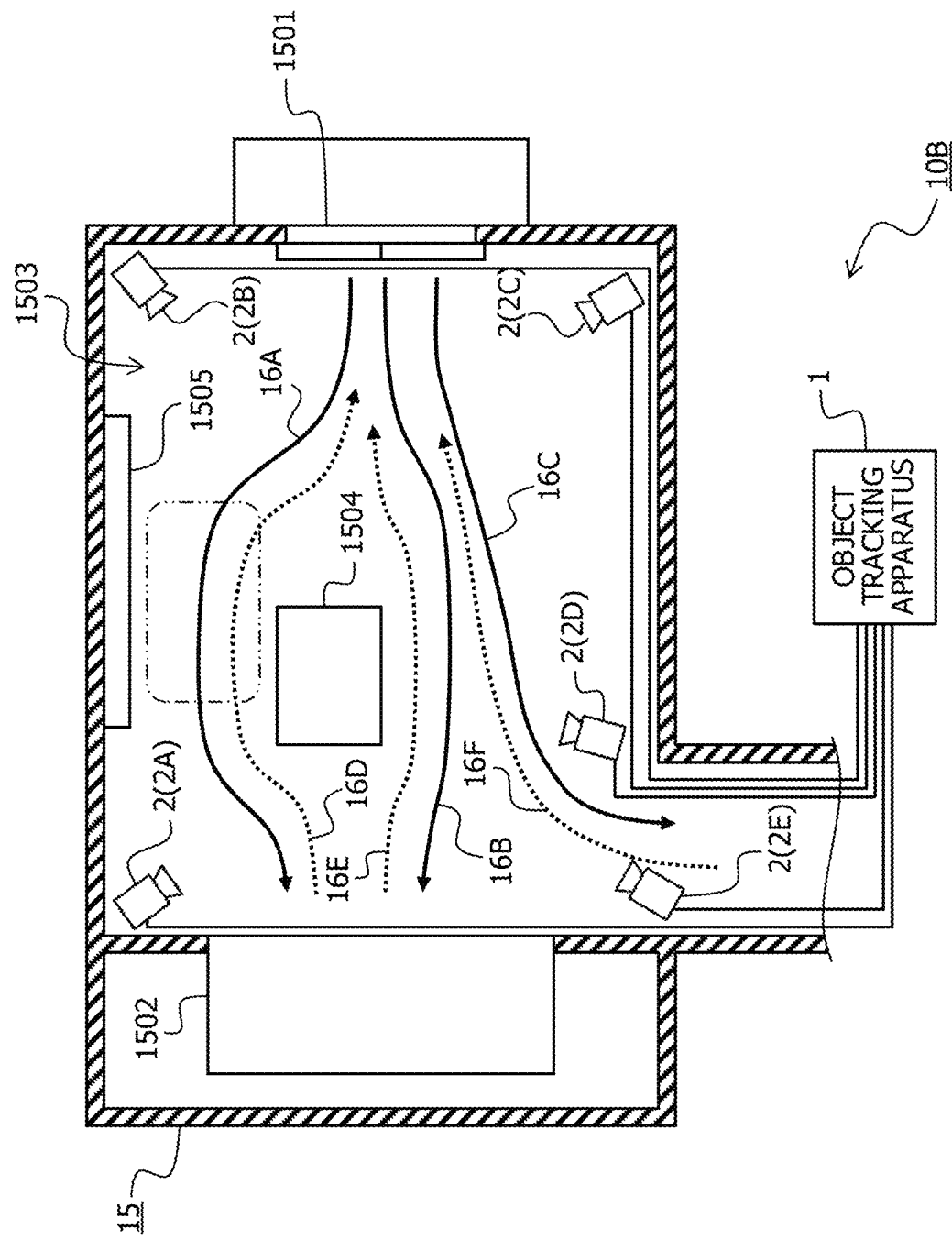
FIG. 13 is a diagram illustrating another system configuration example of the object tracking system.

FIG. 13 is a diagram illustrating another system configuration example of the object tracking system.

FIG. 13 illustrates a system configuration example of an object tracking system 10B for measuring movement paths 16A to 16F of people in a lobby 1503 from an entrance 1501 of a building 15 to a riding place of an elevator 1502. For example, a counter 1504 at which various types guidance for people who move in the lobby 1503 are performed and an exhibit 1505 are placed in the lobby 1503. For measuring the movement paths 16A to 16F and the flow rate of people in such a lobby 1503, for example, the lobby 1503 is image-captured from different directions by using respective cameras 2 (2A to 2E), as in FIG. 13, and pieces of video captured by the respective cameras 2 are used to detect and track the people in the lobby 1503. The cameras 2 installed in the lobby 1503 respectively transmit the captured pieces of video to the object tracking apparatus 1. In accordance with the above-described procedure, the object tracking apparatus 1 detects and tracks the people in the lobby 1503.

In a lobby 1503 like that illustrated in FIG. 13, people who are moving from the entrance 1501 to the elevator 1502 and people who are moving from the elevator 1502 to the entrance 1501 walk past each other. Thus, the pieces of video captured by the cameras 2 include, for example, a frame in which another object that overlaps at the back side of a person who is moving from the entrance 1501 to the elevator 1502 is the exhibit (background) 1505 not to be tracked and a frame in which another object is a person who is moving from the elevator 1502 to the entrance 1501. For example, for tracking a person moving along the movement path 16B in FIG. 13 in the video captured by the camera 2E, the back side of the person is not limited to the counter 1504 and the exhibit 1505 and may be a person who is moving along the movement path 16E. Hence, in the object tracking system 10B in FIG. 13, it is desirable that object tracking using the priority camera information 195 be performed as described above. When object tracking using the priority camera information 195 is performed in the object tracking system 10B in FIG. 13, the movement paths of people in a predetermined space may be tracked accurately.

In addition, the object tracking apparatus 1 in the present embodiment may also be applied to, for example, a signage system including a wall-mounted display.

Figure 14:
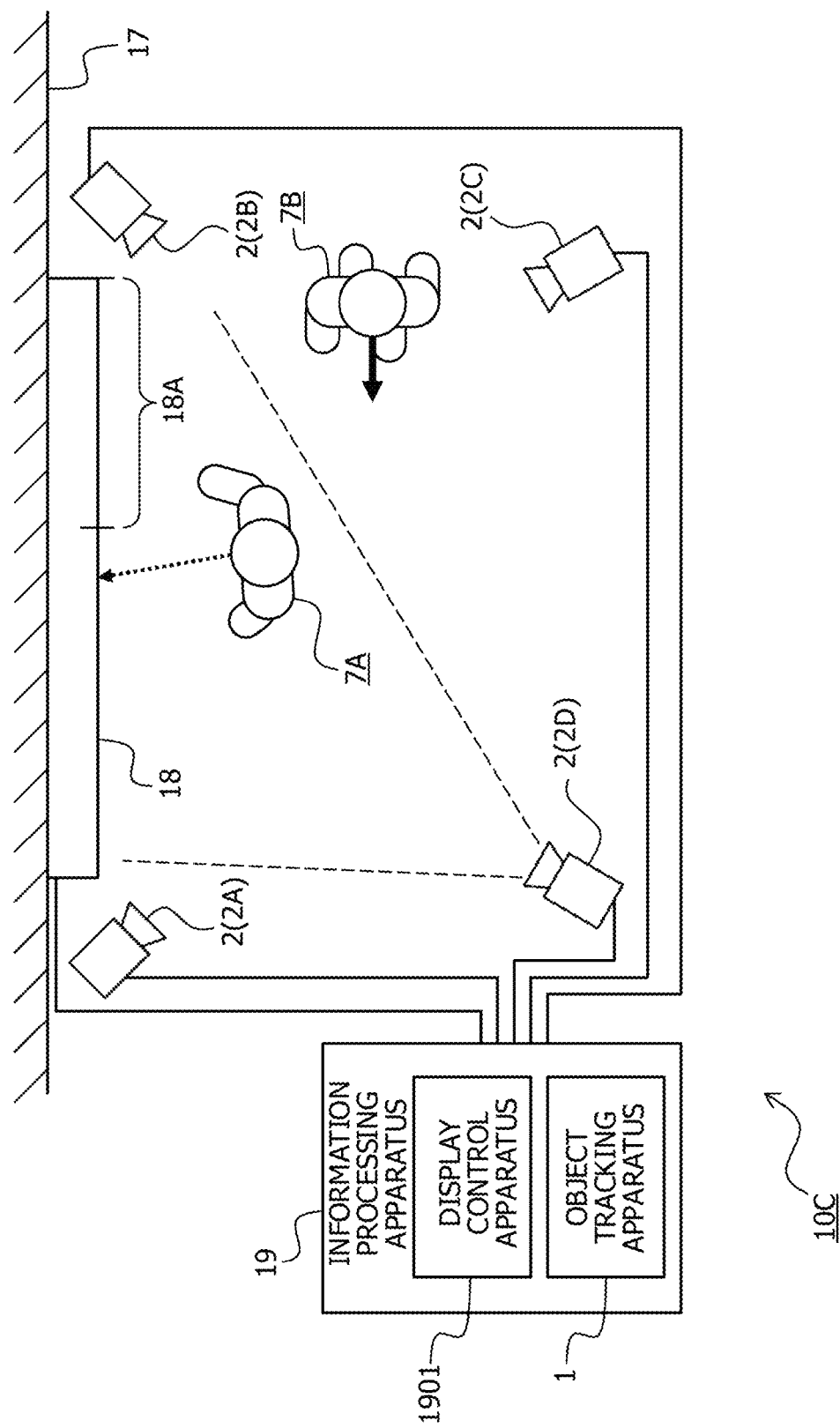
FIG. 14 is a diagram illustrating the system configuration of a signage system including the object tracking apparatus.

FIG. 14 is a diagram illustrating the system configuration of a signage system including the object tracking apparatus.

FIG. 14 illustrates a system configuration example of a signage system 10C in which a wall-mounted display 18 mounted on a wall surface 17 along a passage in a public facility provides various types of information to the public. The signage system 10C includes, for example, cameras 2 (2A to 2D) for capturing pieces of video of a predetermined area, which is in front of the wall-mounted display 18, from respective different directions. The signage system 10C further includes an information processing apparatus 19 for performing, for example, a process for changing what is displayed on the wall-mounted display 18 based on video captured by the cameras 2. The information processing apparatus 19 includes the object tracking apparatus 1 for detecting and tracking people in the video and a display control apparatus 1901 for controlling what is displayed on the wall-mounted display 18. Controlling what is displayed, the controlling being performed by the display control apparatus 1901, includes control for switching what is displayed in accordance with motion of a person 7A in the video captured by the cameras 2.

The cameras 2 (2A to 2D) capture respective pieces of video of the predetermined area, which is in front of the wall-mounted display 18, and transmits the pieces of video to the information processing apparatus 19, which includes the functions of the object tracking apparatus 1. The information processing apparatus 19 detects people from the pieces of video and tracks the people. The process for detecting the people from the video and tracking the people is performed by the object tracking apparatus 1 included in the information processing apparatus 19. As described above, the object tracking apparatus 1 uses the priority camera information 195 to detect and track the people in the video. In addition, the information processing apparatus 19 analyzes operations of the people tracked by the object tracking apparatus 1. Upon detecting a predetermined operation, the information processing apparatus 19 changes what is displayed on the wall-mounted display 18 based on the operation. The process for changing what is displayed on the wall-mounted display 18 is performed by the display control apparatus 1901 included in the information processing apparatus 19. For example, upon detecting that the person 7A being tracked performs an operation of touching a predetermined portion on the wall-mounted display 18, the display control apparatus 1901 switches a screen displayed on the wall-mounted display 18 to a screen in which the portion touched by the person 7A is enlarged.

The signage system 10C in FIG. 14 includes the cameras 2C and 2D for capturing video in which the wall-mounted display 18 overlaps at the back side of the person 7A who is observing the wall-mounted display 18. When a person to be tracked is detected from the video captured by the cameras 2C and 2D, the detection difficulty degree of the person varies depending on what is displayed on a portion that is located in a display region of the wall-mounted display 18 and that overlaps the person 7A to be detected at the back side of the person 7A. For example, when an in-video feature of what is displayed on a region 18A, which is the back side of the person 7A when viewed from the camera 2D in FIG. 14, is similar to a feature of the person 7A, the detection difficulty degree for detecting the person 7A from the video captured by the camera 2D increases. Also, for tracking a person 7B who is moving to the left in FIG. 14, when a feature of the person 7B is similar to a feature of another object that exists at the back side of the person 7B, the detection difficulty degree of the person 7B increases.

Thus, the object tracking apparatus 1 included in the information processing apparatus 19 calculates a backside influence degree $D_{BG}$, for example, based on a predicted position of the movement destination of a person at the image-capture time point of a next frame and what is displayed on a portion displayed on a display region of the wall-mounted display 18 and located at the back side of the person at the movement destination. This allows the object tracking apparatus 1 to select, for detecting a person from video, video (frames) with which the detection difficulty degrees are low, based on the backside influence degrees $D_{BG}$ (the detection difficulty degrees $D_{CP}$) and to accurately detect the position and the operation of a person to be tracked. Accordingly, in the signage system 10C in FIG. 14, it is possible to reduce false detection and erroneous detection of an operation performed by a person who is observing the wall-mounted display 18. Hence, in the signage system 10C in FIG. 14, it is possible to appropriately change what is displayed on the wall-mounted display 18 in accordance with an operation of a person who is observing the wall-mounted display 18, thus improving convenience of the person who is observing the wall-mounted display 18.

Second Embodiment

Figure 15:
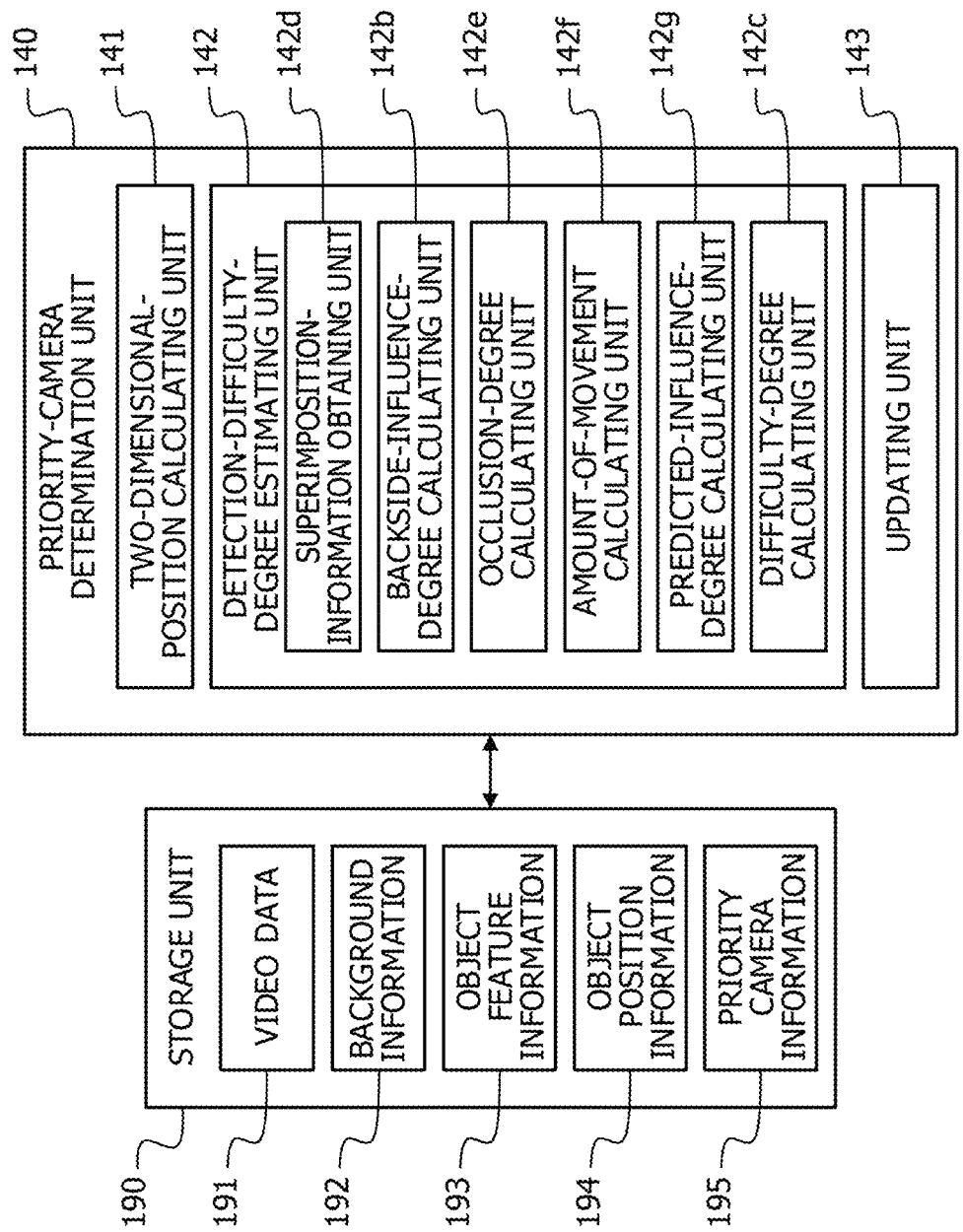
FIG. 15 is a diagram illustrating the functional configuration of a priority-camera determination unit in an object tracking apparatus according to a second embodiment.

FIG. 15 is a diagram illustrating the functional configuration of a priority-camera determination unit in an object tracking apparatus according to a second embodiment.

An object tracking apparatus 1 in the present embodiment includes a video acquisition unit 110, a tracking unit 120, a movement-destination predicting unit 130, a priority-camera determination unit 140, an output unit 150, and a storage unit 190, as in the object tracking apparatus 1 described above in the first embodiment. Each of the video acquisition unit 110, the tracking unit 120, the movement-destination predicting unit 130, the priority-camera determination unit 140, and the output unit 150 in the object tracking apparatus 1 in the present embodiment has the corresponding functions described above in the first embodiment. Hence, as described in the first embodiment, the object tracking apparatus 1 in the present embodiment performs the object tracking process using priority camera information 195 stored in the storage unit 190. The priority camera information 195 includes information (for example, the detection difficulty degrees $D_{CP}$) indicating, during detection of an object to be tracked from pieces of video captured by the cameras, priorities of the pieces of video used for the detection.

The priority-camera determination unit 140 in the object tracking apparatus 1 in the present embodiment updates the priority camera information 195, based on a prediction result obtained by the movement-destination predicting unit 130. The priority-camera determination unit 140 according to the present embodiment calculates the detection difficulty degrees $D_{CP}$, based on backside influence degrees $D_{BG}$, occlusion degrees $D_{FG}$, and predicted influence degrees $D_{MV}$. As described above in the first embodiment, each backside influence degree $D_{BG}$ is a numerical value indicating an influence that another object that overlaps an object to be tracked at the back side of the object to be tracked has on the detection accuracy of the object to be tracked. Each occlusion degree $D_{FG}$ is a numerical value indicating how much an object to be tracked is occluded by another object that overlaps the object to be tracked at the front side of the object to be tracked. Each predicted influence degree $D_{MV}$ is a numerical value indicating an influence that a prediction error in the two-dimensional position of the movement destination of an object to be tracked in a next frame, the movement destination being predicted by the movement-destination predicting unit 130, has on the detection accuracy of the object. The priority-camera determination unit 140 in the present embodiment calculates, for example, each of the backside influence degrees $D_{BG}$, the occlusion degrees $D_{FG}$, and the predicted influence degrees $D_{MV}$ as a value represented by a common index associated with a difficulty degree for detecting an object. The priority-camera determination unit 140 then calculates each detection difficulty degree $D_{CP}$ by using equation (2).

$$D_{CP}=w1 \cdot D_{BG}+w2 \cdot D_{FG}+w3 \cdot D_{MV} \quad (2)$$

In equation (2), w1, w2, and w3 represent weighting factors.

The priority-camera determination unit 140 in the object tracking apparatus 1 in the present embodiment includes, for example, a two-dimensional-position calculating unit 141, a detection-difficulty-degree estimating unit 142, and an updating unit 143, as illustrated in FIG. 15. Each of the two-dimensional-position calculating unit 141 and the updating unit 143 has the corresponding functions described above in the first embodiment.

The detection-difficulty-degree estimating unit 142 according to the present embodiment includes a superimposition-information obtaining unit 142d, a backside-influence-degree calculating unit 142b, an occlusion-degree calculating unit 142e, an amount-of-movement calculating unit 142f, a predicted-influence-degree calculating unit 142g, and a difficulty-degree calculating unit 142c.

Based on a prediction result of the movement destination of an object to be tracked, the superimposition-information obtaining unit 142d obtains superimposition information indicating a feature of a region that overlaps, in a next frame, the object to be tracked and surroundings of the region. The superimposition-information obtaining unit 142d obtains backside information at the movement destination of the object and obtains information indicating another object that overlaps that object at the front side of that object.

Based on the similarity between a feature of the object to be tracked and the backside information obtained by the backside-information obtaining unit 142a, the backside-influence-degree calculating unit 142b calculates a backside influence degree $D_{BG}$. For example, after calculating a degree of similarity between the feature of the object to be tracked and the background information, the backside-influence-degree calculating unit 142b converts the degree of similarity into a backside influence degree $D_{BG}$, based on the correspondence relationship between the degree of similarity and the detection difficulty degree.

Based on a prediction result of the movement destination of the object to be tracked, the occlusion-degree calculating unit 142e calculates an occlusion degree $D_{FG}$ for the object to be tracked in a next frame. The occlusion-degree calculating unit 142e first detects, for example, whether or not another object that overlaps the object to tracked in the next frame exists at the front side of the object to be tracked. When the other object exists, the occlusion-degree calculating unit 142e calculates the rate of a portion of the entire object to be tracked, the portion overlapping the other object. Thereafter, based on the correspondence relationship between the portion of the object to be tracked, the portion overlapping the other object, and the detection difficulty, the occlusion-degree calculating unit 142e converts the rate of the portion that overlaps the other object into an occlusion degree $D_{FG}$.

The amount-of-movement calculating unit 142f calculates the amount of movement of the object to be tracked in a frame, the amount of movement being calculated based on a prediction result of the movement destination of the object.

The predicted-influence-degree calculating unit 142g calculates a predicted influence degree $D_{MV}$, based on the amount of movement of the object in the frame, the amount of movement being calculated by the amount-of-movement calculating unit 142f. For example, based on the correspondence relationship between the amount of in-frame movement of the object to be tracked and the detection difficulty, the predicted-influence-degree calculating unit 142g converts the amount of movement into a predicted influence degree $D_{MV}$.

The difficulty-degree calculating unit 142c calculates a detection difficulty degree $D_{CP}$, based on the backside influence degree $D_{BG}$, the occlusion degree $D_{FG}$, and the predicted influence degree $D_{MV}$. For example, the difficulty-degree calculating unit 142c calculates the detection difficulty degree $D_{CP}$ by using equation (2) noted above.

As described above, the priority-camera determination unit 140 according to the present embodiment calculates the detection difficulty degree $D_{CP}$, considering another object occluding an object to be tracked and an influence that each prediction accuracy of the movement destination has on the difficulty degree of the object detection, in addition to the backside influence degree.

The object tracking apparatus 1 in the present embodiment obtains pieces of video captured by the plurality of cameras and performs a process for detecting, from the pieces of video, an object to be tracked and tracking the object. The object tracking apparatus 1 in the present embodiment performs, for example, the process according to the flowchart in FIG. 4 as the process for detecting, from the pieces of video, an object to be tracked and tracking the object. When the object tracking apparatus 1 in the present embodiment performs the time-series loop process (steps S1 to S6) in FIG. 4, the priority-camera determination unit 140 in the object tracking apparatus 1 performs, for example, the process according to the flowchart in FIG. 16 as the priority-camera information update process (step S5).

Figure 16:
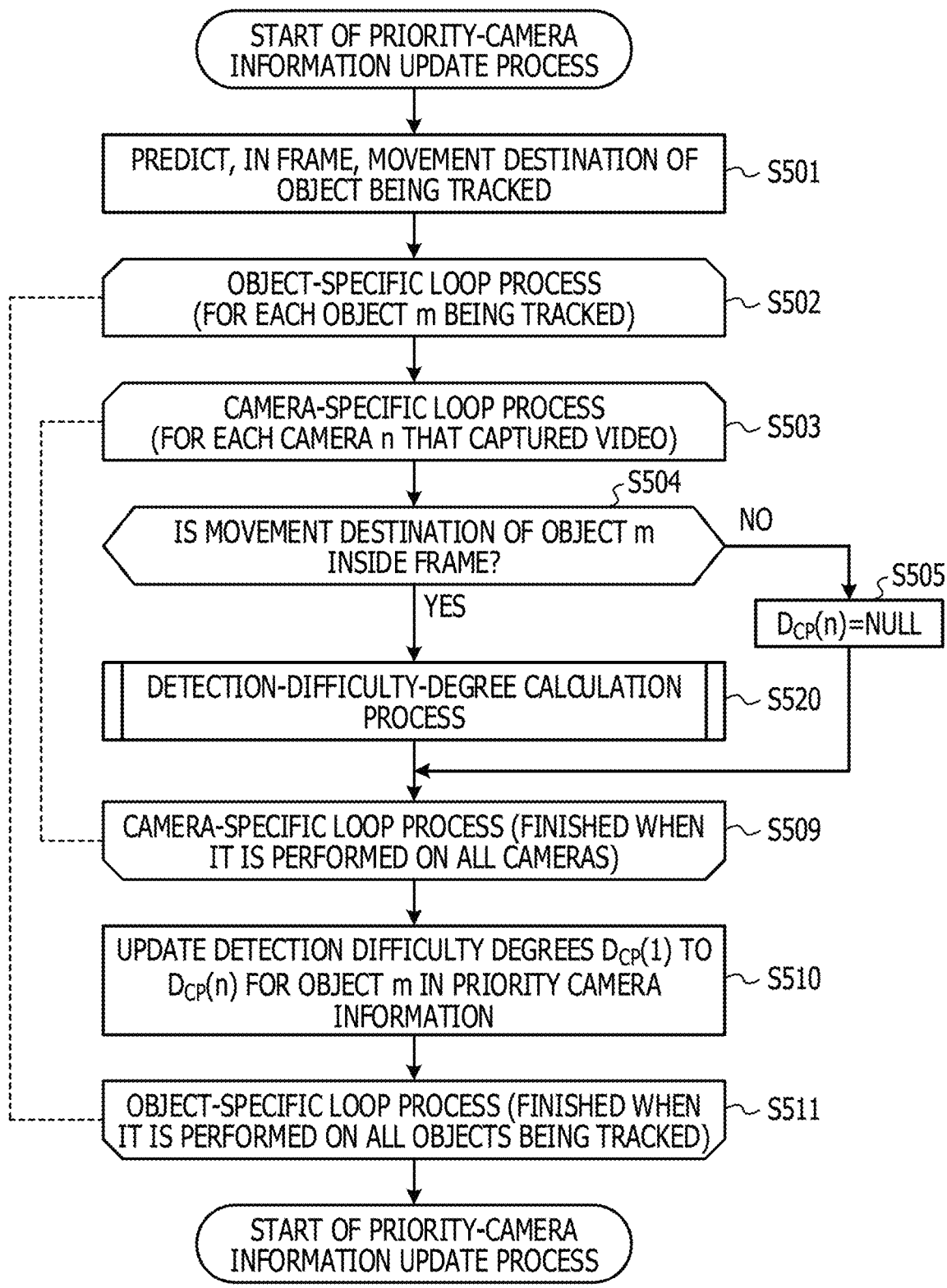
FIG. 16 is a flowchart illustrating details of a priority-camera information update process in the second embodiment.

FIG. 16 is a flowchart illustrating details of the priority-camera information update process in the second embodiment.

As illustrated in FIG. 16, the priority-camera determination unit 140 predicts, for each frame, the movement destination of an object being tracked (step S501). The process in steps 501 is performed by the two-dimensional-position calculating unit 141 included in the priority-camera determination unit 140.

Next, the priority-camera determination unit 140 performs, for each object being tracked, an object-specific loop process (steps S502 to S511) for calculating detection difficulty degrees for detecting an object from respective next frames in pieces of video and for updating the priority camera information 195. For example, at the starting end (step S502) of the object-specific loop process, the priority-camera determination unit 140 selects one object m included in M objects being tracked and specified by a variable m. For example, at the last end (step S511) of the object-specific loop process, the priority-camera determination unit 140 determines whether or not the process has been performed on all objects being tracked. When there is an object on which the process has not been performed, the priority-camera determination unit 140 continues the object-specific loop process. When the process has been performed on all objects being tracked, the priority-camera determination unit 140 finishes the object-specific loop process.

After selecting the object at the starting end of the object-specific loop process, the priority-camera determination unit 140 performs, for each camera 2, a camera-specific loop process (steps S503 to S509) for calculating a detection difficulty degree $D_{CP}(n)$ for the object m in a next frame captured by the camera. At the starting end (step S503) of the camera-specific loop process, the priority-camera determination unit 140 selects one camera n specified by a variable n from N cameras 2. At the last end (step S509) of the camera-specific loop process, the priority-camera determination unit 140 determines whether or not the process has been performed on all the cameras. When there is a camera on which the process has not been performed, the priority-camera determination unit 140 continues the camera-specific loop process. When the process has been performed on all the cameras, the priority-camera determination unit 140 finishes the camera-specific loop process.

After selecting the camera n at the starting end (step S503) of the camera-specific loop process, the priority-camera determination unit 140 determines whether or not the movement destination of the selected object m is inside the frame in video captured by the camera n (step S504). The process in steps S504 is performed by, for example, the detection-difficulty-degree estimating unit 142 included in the priority-camera determination unit 140. When the movement destination of the object m is outside the frame (NO in step S504), the detection-difficulty-degree estimating unit 142 determines that the detection difficulty degree $D_{CP}(n)$ for detecting the object m from the next frame in the video captured by the camera n has an invalid value (for example, a null value) (step S505). On the other hand, when the movement destination of the object m is inside the frame (YES in step S504), the detection-difficulty-degree estimating unit 142 performs a detection-difficulty-degree calculation process (step S520) for calculating the detection difficulty degree $D_{CP}(n)$ based on the backside influence degree $D_{BG}$, the occlusion degree $D_{FG}$, and the predicted influence degree $D_{MV}$.

In step S520, the detection-difficulty-degree estimating unit 142 performs, for example, the following processes:

(1) a process for calculating the backside influence degree $D_{BG}$, based on the backside information at the movement destination of the object m in the frame captured by the camera n;

(2) a process for calculating, when another object that overlaps the object m at the front side of the object m at the movement destination of the object m in the frame captured by the camera n exists, the occlusion degree $D_{FG}$ based on the rate of a portion of the object m, the portion being occluded by the other object at the front side of the object m;

(3) a process for calculating the predicted influence degree $D_{MV}$, based on the amount of movement of the object m in the frame captured by the camera n; and (4) a process for calculating the detection difficulty degree $D_{CP}$ for detecting the object m from a next frame in the video captured by the camera n, by using equation (2) noted above.

Upon finishing the process in step S505 or S520, the detection-difficulty-degree estimating unit 142 determines whether or not there is a camera for which the detection difficulty degree $D_{CP}(n)$ has not been determined (step S509). When there is a camera for which the detection difficulty degree $D_{CP}(n)$ has not been determined, the detection-difficulty-degree estimating unit 142 continues the camera-specific loop process. When the detection difficulty degrees $D_{CP}(n)$ for all the cameras are determined, the detection-difficulty-degree estimating unit 142 finishes the camera-specific loop process.

After finishing the camera-specific loop process, the detection-difficulty-degree estimating unit 142 updates the detection difficulty degrees $D_{CP}(1)$ to $D_{CP}(N)$ for the object m in the priority camera information 195 (step S510). The process in steps S510 is performed by the updating unit 143 included in the priority-camera determination unit 140.

After finishing the process in step S510, the priority-camera determination unit 140 determines whether or not an object for which the detection difficulty degrees $D_{CP}(1)$ to $D_{CP}(N)$ in the priority camera information 195 have not been updated exists in the objects being tracked (step S511). When there is an object for which the detection difficulty degrees $D_{CP}(1)$ to $D_{CP}(N)$ have not been updated, the priority-camera determination unit 140 continues the object-specific loop process. When the detection difficulty degrees $D_{CP}(1)$ to $D_{CP}(N)$ for all the objects have been updated, the priority-camera determination unit 140 finishes the object-specific loop process and ends the priority-camera information update process.

As described above, in the priority-camera information update process in the present embodiment, the detection difficulty degree $D_{CP}$ is calculated based on the backside influence degree $D_{BG}$, the occlusion degree $D_{FG}$, and the predicted influence degree $D_{MV}$ in a frame captured next to the frame that is currently processed. That is, the object tracking apparatus 1 in the present embodiment calculates the detection difficulty degree $D_{CP}$, considering that the detection difficulty degree increases when an object to be detected from a frame is occluded by another object that exists at the front side of the object to be detected and that the detection accuracy varies depending on a prediction error in the movement destination of the object, in addition to the backside influence degree. Thus, in the priority camera information 195 used in the object tracking apparatus 1 in the present embodiment, even when the backside influence degree $D_{BG}$ is low, the detection difficulty degree $D_{CP}$ increases when the occlusion degree $D_{FG}$ and/or the predicted influence degree $D_{MV}$ are/is high. In other words, during detection of an object from video captured by a camera with which the detection difficulty degree $D_{CP}$ is low in the priority camera information 195, the tracking unit 120 in the present embodiment makes it possible to inhibit the object being occluded by another object at the front side thereof and to inhibit failing in detecting the object owing to an influence of a prediction error. Thus, in the object tracking apparatus 1 in the present embodiment, the tracking accuracy of an object being tracked further improves.

Figure 17:
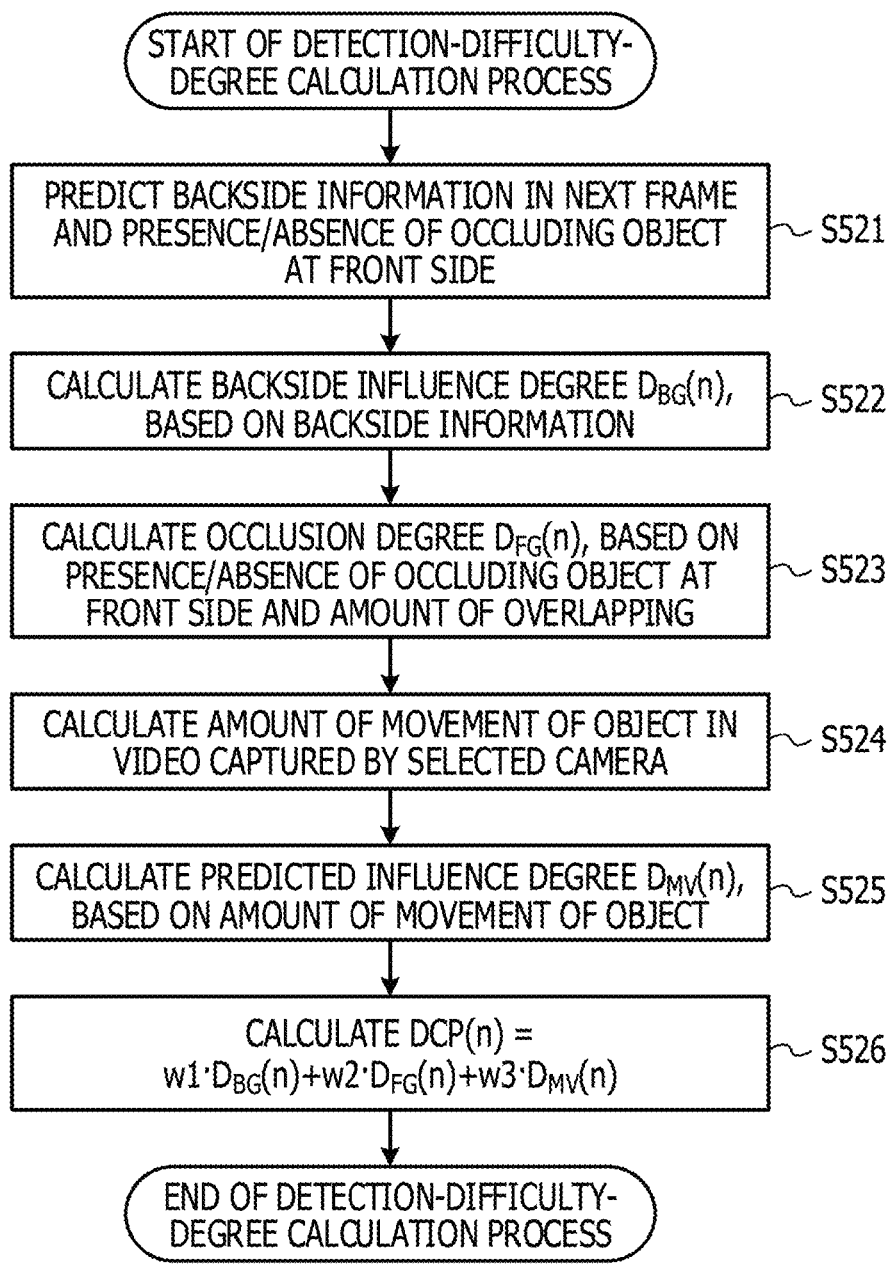
FIG. 17 is a flowchart illustrating details of a detection-difficulty-degree calculation process according to the second embodiment.

FIG. 17 is a flowchart illustrating details of the detection-difficulty-degree calculation process according to the second embodiment.

The detection-difficulty-degree calculation process (step S520) in the priority-camera information update process performed by the object tracking apparatus 1 in the present embodiment is performed by the detection-difficulty-degree estimating unit 142. First, based on the movement destination of an object being tracked and an accompanying portion of the object, the detection-difficulty-degree estimating unit 142 predicts backside information at the movement destination of an object m in a next frame and the presence/absence of an occluding object at the front side thereof (step S521). Step S521 is performed by the superimposition-information obtaining unit 142d included in the detection-difficulty-degree estimating unit 142. Based on the in-frame two-dimensional position of the object being tracked, the two-dimensional position being calculated in step S501, and a real-space three-dimensional position of each object, the superimposition-information obtaining unit 142d obtains backside information about another object that exists at the back side of the object m at the movement destination of the object m. Based on the in-frame two-dimensional position of the object being tracked and the real-space three-dimensional position of each object, the superimposition-information obtaining unit 142d predicts the presence/absence of another object that occludes the object m at the movement destination of the object m.

Next, the detection-difficulty-degree estimating unit 142 calculates a backside influence degree $D_{BG}(n)$ for detecting the object m from a next frame in video captured by the camera n (step S522). The process in steps S522 is performed by the backside-influence-degree calculating unit 142b included in the detection-difficulty-degree estimating unit 142. The backside-influence-degree calculating unit 142b calculates the backside influence degree $D_{BG}(n)$ by performing a process that is the same as or similar to step S507 described above in the first embodiment.

Next, the detection-difficulty-degree estimating unit 142 calculates an occlusion degree $D_{FG}(n)$, based on the presence/absence of another object that occludes the object m at the movement destination of the object m and the amount of overlapping of the other object (step S523). The process in steps S523 is performed by the occlusion-degree calculating unit 142e included in the detection-difficulty-degree estimating unit 142. The occlusion-degree calculating unit 142e first determines the presence/absence of another object that occludes the object m, based on the result of the prediction performed in step S521 about the presence/absence of an object that occludes the object m. When there is no other object that occludes the object m, the occlusion-degree calculating unit 142e calculates the occlusion degree $D_{FG}(n)$, assuming that the amount of overlapping between the object m and another object that occludes the object m is "0". On the other hand, when there is another object that occludes the object m, the occlusion-degree calculating unit 142e calculates the occlusion degree $D_{FG}(n)$ according to the amount of overlapping between the object m and the other object that occludes the object m.

During detection of the object m in a frame, when another object at the front side occludes the object m, the detection accuracy of the object m decreases. Also, during detection of the object m in a frame, the detection accuracy of the object m decreases, as the rate of a portion of the entire object m, the portion being occluded by another object, increases. Accordingly, the occlusion-degree calculating unit 142e calculates the occlusion degree $D_{FG}(n)$ so that the occlusion degree $D_{FG}(n)$ increases as the amount of overlapping between the object m and another object that occludes the object m increases.

After step S523, the detection-difficulty-degree estimating unit 142 calculates the amount of movement of the object m in the frame captured by the camera n (step S524). The process in steps S524 is performed by the amount-of-movement calculating unit 142f included in the difficulty-degree calculating unit 142c. The amount-of-movement calculating unit 142f calculates the amount of movement of the object m, based on the detection position of the object m in the frame captured by the camera n and the position of the movement destination of the object m.

Next, the detection-difficulty-degree estimating unit 142 calculates a predicted influence degree $D_{MV}(n)$, based on the amount of movement of the object (step S525). The process in steps S525 is performed by the predicted-influence-degree calculating unit 142g included in the detection-difficulty-degree estimating unit 142. The three-dimensional position of the movement destination of the object m, the movement destination being predicted by the movement-destination predicting unit 130, is a predicted value and thus may differ from the three-dimensional position of the object at the image-capture time point of a next frame. Also, there are tendencies that as the distance (the amount of movement of the object m) from the position of the object m detected in a frame to the predicted position of the object m increases, the amount of influence of an error in the predicted position increases, and a difference between the predicted position of the object m in a next frame and the actual position of the object m increases. Thus, as the amount of movement of the object m increases, the difficulty in detecting the object m from a next frame increases, that is, the detection difficulty degree increases. Accordingly, the predicted-influence-degree calculating unit 142g calculates the predicted influence degree $D_{MV}(n)$ so that the predicted influence degree $D_{MV}(n)$ increases as the amount of movement of the object m increases.

Next, based on the calculated backside influence degree $D_{BG}(n)$, occlusion degree $D_{FG}(n)$, and predicted influence degree $D_{MV}(n)$, the detection-difficulty-degree estimating unit 142 calculates a detection difficulty degree $D_{CP}(n)$ for detecting the object m from a next frame in the video captured by the camera n (step S526). The process in steps S526 is performed by the difficulty-degree calculating unit 142c included in the detection-difficulty-degree estimating unit 142. The difficulty-degree calculating unit 142c calculates the detection difficulty degree $D_{CP}(n)$, for example, by using equation (3) below.

$$D_{CP}(n) = w1 \cdot D_{BG}(n) + w2 \cdot D_{FG}(n) + w3 \cdot D_{MV}(n) \quad (3)$$

Upon calculating the detection difficulty degree $D_{CP}(n)$, the detection-difficulty-degree estimating unit 142 ends the detection-difficulty-degree calculation process for the frame captured by the camera n.

The flowchart in FIG. 17 is merely an example of the detection-difficulty-degree calculation process (step S520) according to the present embodiment. The detection-difficulty-degree calculation process according to the present embodiment is not limited to the process according to the flowchart in FIG. 17 and may be modified as appropriate. For example, the detection-difficulty-degree calculation process may be processing in which the processes in steps S522, S523, S525, and S526 are performed after the processes in steps S521 and S524. For example, the detection-difficulty-degree calculation process may be processing in which the processes in steps S521 to S523 and the processes in steps S524 and S525 are performed in parallel.

Figure 18:
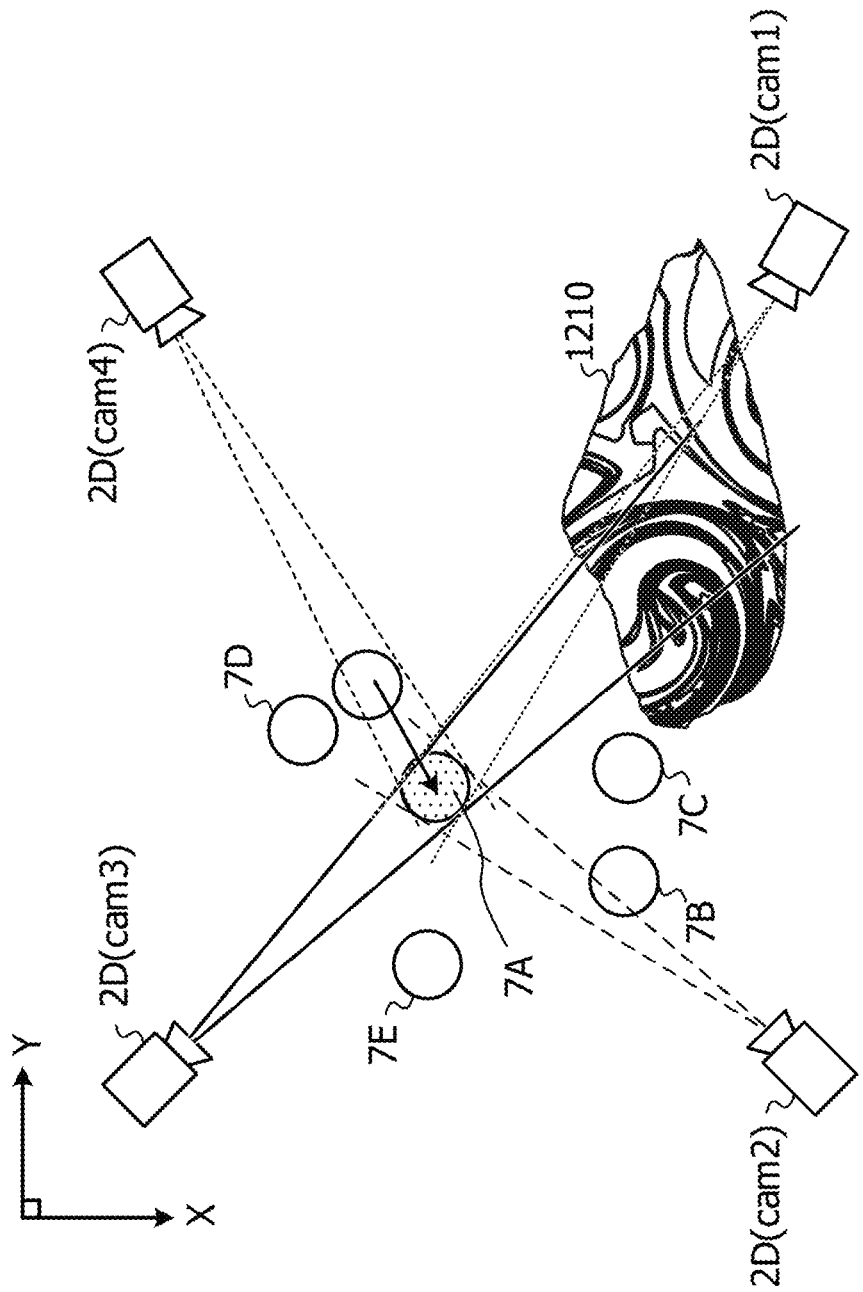
FIG. 18 is a diagram illustrating an example of the position of an object being tracked and detection difficulty degrees.

FIG. 18 is a diagram illustrating an example of the position of an object being tracked and detection difficulty degrees.

FIG. 18 illustrates a calculation method for detection difficulty degrees $D_{CP}(1)$ to $D_{CP}(4)$ in the camera-specific loop process (steps S503 to S509) performed in a state in which an object 7A is selected as a target to be processed. Based on prediction results of the movement destinations of five objects 7A to 7E being tracked which include the object 7A in real space, the detection-difficulty-degree estimating unit 142 in the present embodiment calculates detection difficulty degrees $D_{CP}(1)$ to $D_{CP}(4)$ for the object 7A.

When the predicted positions of the movement destinations of the five objects 7A to 7E being tracked are positions illustrated in FIG. 18, the following may be said about backside influence degrees $D_{BG}(cam1)$ to $D_{BG}(cam4)$ for detecting the object 7A from frames captured by the four cameras 2A to 2D.

In the frame captured by the first camera 2A(cam1), another object (including the objects 7B and 7C) that overlaps the object 7A at the back side of the object 7A and influences detection of the object 7A does not exist. Similarly, in the frame captured by the fourth camera 2D(cam4), another object (including the objects 7B and 7C) that overlaps the object 7A at the back side of the object 7A and that influences detection of the object 7A does not exist. In contrast, in the video (frame) captured by the second camera 2B(cam2), the object 7D that is located at the back side of the object 7A overlaps the object 7A. Thus, when the similarity between a feature of the object 7A in the video captured by the second camera 2B and a feature of the object 7D is high, the backside influence degree $D_{BG}(2)$ becomes larger than the backside influence degrees $D_{BG}(1)$ and $D_{BG}(4)$.

In the frame captured by the third camera 2C(cam3), a part 1210 of a background which is located at the back side of the object 7A overlaps the object 7A. In this case, when the similarity between the feature of the part 1210 of the background and the feature of the object 7A is assumed to be high, the backside influence degree $D_{BG}(3)$ becomes larger than the backside influence degrees $D_{BG}(1)$ and $D_{BG}(4)$.

Next, a description will be given of occlusion degrees. When the movement destinations of the predicted positions of the five objects 7A to 7E being tracked are the positions illustrated in FIG. 18, the following may be said about occlusion degrees $D_{FG}(cam1)$ to $D_{FG}(cam4)$ for detecting the object 7A from frames captured by the respective four cameras 2A to 2D.

In the frame captured by the first camera 2A(cam1), another object (including the objects 7B and 7C) that overlaps the object 7A at the front side of the object 7A and that influences detection of the object 7A does not exist. Also, in the frame captured by the third camera 2C(cam3), another object (including the objects 7B and 7C) that overlaps the object 7A at the front side of the object 7A and that influences detection of the object 7A does not exist. Similarly, in the frame captured by the fourth camera 2D(cam4), another object (including the objects 7B and 7C) that overlaps the object 7A at the back side of the object 7A and that influences detection of the object 7A does not exist. In contrast, in the video (frame) captured by the second camera 2B(cam2), the object 7B that is located at the front side of the object 7A overlaps a part of the object 7A. Thus, the occlusion degree $D_{FG}(2)$ for the object 7A in the frame captured by the second camera 2B becomes larger than the occlusion degrees $D_{FG}(1)$, $D_{FG}(3)$, and $D_{BG}(4)$.

Lastly, a description will be given of predicted influence degrees. When the predicted positions of the movement destinations of the five objects 7A to 7E being tracked are the positions illustrated in FIG. 18, the following may be said about predicted influence degrees $D_{MV}(cam1)$ to $D_{MV}(cam4)$ for detecting the object 7A from frames captured by the respective four cameras 2A to 2D.

In FIG. 18, the movement destination of the object 7A is denoted by a solid-line arrow. That is, the direction of movement of the object 7A is generally parallel to a depth direction in the frame captured by the second camera 2B(cam2) and a depth direction in the frame captured by the fourth camera 2D(cam4). In contrast, the direction of the movement of the object 7A is generally orthogonal to a depth direction in the frame captured by the first camera 2A(cam1) and a depth direction in the frame captured by the third camera 2C(cam3). Accordingly, the amounts of movement of the object 7A in the frame captured by the first camera 2A(cam1) and in the frame captured by the third camera 2C(cam3) become larger than the amounts of movement of the object 7A in the frame captured by the second camera 2B(cam2) and in the frame captured by the fourth camera 2D(cam4). Hence, the predicted influence degree $D_{MV}(1)$ and the predicted influence degree $D_{MV}(3)$ become larger than the predicted influence degree $D_{MV}(2)$ and the predicted influence degree $D_{MV}(4)$.

In this case, for ease of description, each of the backside influence degrees $D_{BG}$, the occlusion degrees $D_{FS}$, and the occlusion degrees $D_{MV}$ is assumed to take a value of 1 or 2. In this case, the detection difficulty degrees $D_{CP}(1)$ to $D_{CP}(4)$ for the four cameras 2A to 2D in FIG. 18 are given by equations (4-1) to (4-4) below.

$$D_{CP}(1) = w1 \cdot 1 + w2 \cdot 1 + w3 \cdot 2 \qquad (4\text{-}1)$$

$$D_{CP}(2) = w1 \cdot 2 + w2 \cdot 2 + w3 \cdot 1 \qquad (4\text{-}2)$$

$$D_{CP}(3) = w1 \cdot 1 + w2 \cdot 2 + w3 \cdot 2 \qquad (4\text{-}3)$$

$$D_{CP}(4) = w1 \cdot 1 + w2 \cdot 1 + w3 \cdot 1 \qquad (4\text{-}4)$$

In this case, when weighting factors w1, w2, and w3 are assumed to be w1=3, w2=2, and w3=1, respectively, the detection difficulty degrees $D_{CP}(1)$ to $D_{CP}(4)$ for the four cameras 2A to 2D in FIG. 18 are given by equations (5-1) to (5-4) below.

$$D_{CP}(1) = 3 \cdot 1 + 2 \cdot 1 + 1 \cdot 2 = 7 \qquad (5\text{-}1)$$

$$D_{CP}(2) = 3 \cdot 2 + 2 \cdot 2 + 1 \cdot 1 = 11 \qquad (5\text{-}2)$$

$$D_{CP}(3) = 3 \cdot 1 + 2 \cdot 2 + 1 \cdot 2 = 9 \qquad (5\text{-}3)$$

$$D_{CP}(4) = 3 \cdot 1 + 2 \cdot 1 + 1 \cdot 1 = 6 \qquad (5\text{-}4)$$

In this case, the priorities of the cameras are in an ascending order of the detection difficulty degree $D_{CP}$, that is, in the order of the fourth camera 2D, the first camera 2A, the third camera 2C, and the second camera 2B. For example, when the object 7A is detected using the detection difficulty degrees $D_{CP}(1)$ to $D_{CP}(4)$ in equations (5-1) to (5-4), for example, it is preferable that the object 7A be detected from frames captured by the fourth camera 2D, the first camera 2A, and the third camera 2C. This improves the detection accuracy of the object 7A and improves the tracking accuracy of the object 7A. The combination of the aforementioned numerical values of the backside influence degrees $D_{BG}$, the locking degrees $D_{FG}$, the predicted influence degrees $D_{MV}$, and the weighting factors w1, w2, and w3 is merely an example. The values that are taken by the backside influence degrees $D_{BG}$, the occlusion degrees $D_{FG}$, and the predicted influence degrees $D_{MV}$ may be changed as appropriate, in accordance with features of backgrounds in frames and a feature of an object to be tracked. The combination of the numerical values of the weighting factors w1, w2, and w3 may also be changed as appropriate, for example, in accordance with the factors considered to be important among the backside influence degrees $D_{BG}$, the occlusion degrees $D_{FG}$, and the predicted influence degrees $D_{MV}$.

As described above, the object tracking apparatus 1 in the present embodiment predicts the movement destination of an object being tracked and calculates a detection difficulty degree $D_{CP}$ indicating an influence that a feature of the surroundings of the position of the object to be tracked in a frame from which the object is to be detected has on the detection accuracy of the object being tracked. The detection difficulty degree $D_{CP}$ calculated by the object tracking apparatus 1 in the present embodiment includes a backside influence degree $D_{BG}$ indicating the degree of influence that the degree of similarity between a feature of the object to be detected in the frame and the feature of another object (including the background) that overlaps the object at the back side of the object to be detected has on the detection accuracy of the object. The detection difficulty degree $D_{CP}$ calculated by the object tracking apparatus 1 in the present embodiment includes an occlusion degree $D_{FG}$ indicating the degree of influence that the presence/absence of another object that overlaps, in a frame, an object to be detected at the front side of the object to be detected has on the detection accuracy of the object. In addition, the detection difficulty degree $D_{CP}$ calculated by the object tracking apparatus 1 in the present embodiment includes a predicted influence degree $D_{MV}$ indicating the degree of influence that an error in the prediction result of the movement destination of an object has on the detection accuracy of the object. As described above, the object tracking apparatus 1 in the present embodiment calculates the detection difficulty degree $D_{CP}$ considering the degree of influence of a plurality of types of element that influences the detection accuracy for detecting an object from a frame, and based on the detection difficulty degree $D_{CP}$, the object tracking apparatus 1 selects a frame (camera) from which the object is to be detected. Hence, when objects being tracked are mingled in a complex manner, the object tracking apparatus 1 in the present embodiment allows an object to be tracked to be detected and tracked with high accuracy.

For example, the object tracking apparatus 1 in the present embodiment may be used in the object tracking system 10A in FIG. 2. In the object tracking system 10A in FIG. 2, as described above, the plurality of cameras 2 captures pieces of video of a sports game or the like performed in the image-capture area 6, and the object tracking apparatus 1 detects the people (players) 7A to 7E and 8A to 8E from the pieces of video captured by the cameras 2 and tracks the detected people 7A to 7E and 8A to 8E. For example, in the sport game, since the people (players) 7A to 7E and 8A to 8E take actions in accordance with their individual roles and moment-to-moment situations, the positional relationship of the people changes in a complex manner. Thus, for example, some of the people may gather at a specific position in the image-capture area 6. In addition, in a sports game, a person may move in a direction not expected by another person, for example, based on an instantaneous decision. Thus, when people are to be detected from captured video of a sports game and are to be tracked, it is preferable that the object tracking apparatus 1 calculate, for each person, the detection difficulty degree $D_{CP}$, considering the state of the back side in a frame, whether or not the person is occluded by another object, and the correctness of a prediction result of the movement destination.

During detection and tracking of the people (players) 7A to 7E and 8A to 8E, the object tracking apparatus 1 in the present embodiment calculates, for each person, the detection difficulty degree $D_{CP}$ considering three kinds of factor, that is, the backside influence degree $D_{BG}$, the occlusion degree $D_{FG}$, and the predicted influence degree $D_{MV}$, based on a predicted position of the movement destination. Hence, when people (players) are to be detected from pieces of captured video of a sports game and are to be tracked, the object tracking apparatus 1 in the present embodiment may select, for each person, a frame with which the detection difficulty degree is low from a plurality of frames captured at a same time point and may detect and track the person with high accuracy.

The object tracking apparatus 1 in the present embodiment may be used not only to capture video of a sports game but also to detect an object to be tracked from another type of video and track the object. For example, the object tracking apparatus 1 in the present embodiment is also applicable to a system for measuring movement paths of a large number of unspecified people in a building, like the object tracking system 10B in FIG. 13. In addition, the object tracking apparatus 1 in the present embodiment is applicable to, for example, the signage system 10C in FIG. 14.

The object tracking apparatus 1 described above in each embodiment may be realized by a computer and a program to be executed by the computer. An object tracking apparatus 1 realized by a computer and a program will be described below with reference to FIG. 19.

Figure 19:
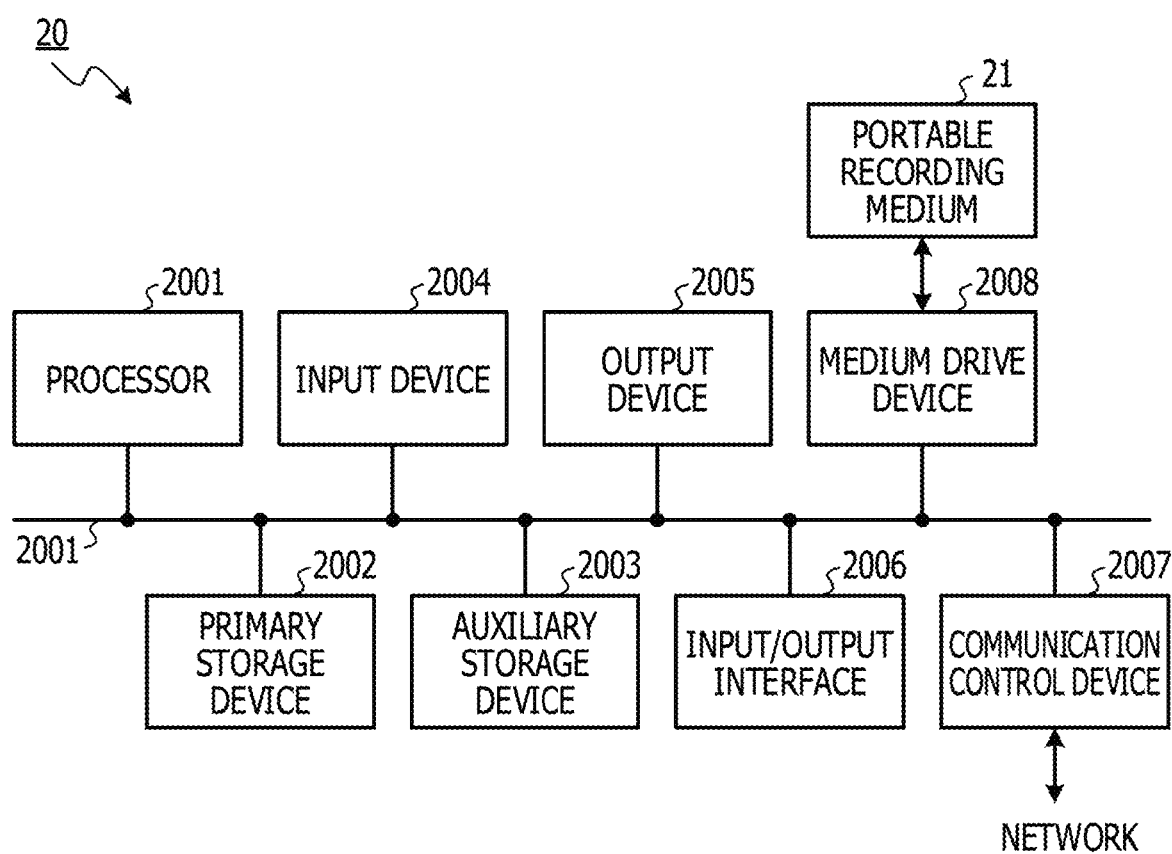
FIG. 19 is a diagram illustrating the hardware configuration of a computer.

FIG. 19 is a diagram illustrating the hardware configuration of a computer.

As illustrated in FIG. 19, a computer 20 includes a processor 2001, a primary storage device 2002, an auxiliary storage device 2003, an input device 2004, an output device 2005, an input/output interface 2006, a communication control device 2007, and a medium drive device 2008. These elements 2001 to 2008 in the computer 20 are inter-connected through a bus 2010 to enable data exchange between the elements 2001 to 2008.

The processor 2001 is a central processing unit (CPU), a micro processing unit (MPU), or the like. The processor 2001 controls the entire operation of the computer 20 by executing various programs including an operating system. The processor 2001 also detects an object to be tracked from pieces of video captured by a plurality of cameras 2 and tracks the object, for example, by executing an object tracking program including the processes in the flowchart in FIG. 4. The object tracking process (step S2) in the object tracking program which uses the priority camera information includes, for example, the process according to the flowchart in FIG. 5 or 11. The priority-camera information update process (step S5) in the object tracking program includes, for example, the process according to the flowchart in FIG. 6 or 16. When the priority-camera information update process (step S5) in the object tracking program includes the process according to the flowchart in FIG. 16, the detection-difficulty-degree calculation process (step S520) includes, for example, the process according to the flowchart in FIG. 17.

The primary storage device 2002 includes a read only memory (ROM) a random access memory (RAM), which are not illustrated. For example, a predetermined basic control program and so on to be read by the processor 2001 upon startup of the computer 20 are pre-recorded in the ROM in the primary storage device 2002. The processor 2001 uses the RAM in the primary storage device 2002 as a storage area for work, as appropriate, during execution of various programs. The RAM in the primary storage device 2002 may be used, for example, to store the background information 192, the object feature information 193, the object position information 194, the priority camera information 195, and so on.

The auxiliary storage device 2003 has a large capacity compared with the RAM in the primary storage device 2002, and examples of the auxiliary storage device 2003 includes a hard disk drive (HDD) and a nonvolatile memory (including a solid-state drive (SSD)), such as a flash memory. The auxiliary storage device 2003 may be used, for example, to store various programs executed by the processor 2001 and various data. The auxiliary storage device 2003 may also be used, for example, to store the above-described object tracking program. The auxiliary storage device 2003 may also be used, for example, to store the video data 191, the background information 192, the object feature information 193, the object position information 194, the priority camera information 195, and so on.

Examples of the input device 2004 include a keyboard device, a mouse device, and a touch panel device. The input device 2004 may also be used, for example, to select a camera that is to capture video, to set a period of time for tracking in video to select an object feature included in the object feature information 193, and to set the weighting factors w1, w2, and w3 in equation (2).

Examples of the output device 2005 include a display device, such as a liquid-crystal display device, and a printer. The output device 2005 may be used, for example, to display and/or print the object position information 194, the priority camera information 195, and so on.

The input/output interface 2006 provides connection between the computer 20 and other electronic equipment. The input/output interface 2006 includes, for example, a connector according to a Universal Serial Bus (USB) standard. The input/output interface 2006 may be used, for example, for connection with the computer 20 and the cameras 2.

The communication control device 2007 connects the computer 20 to a network, such as the Internet and controls various communications with the computer 20 and the other electronic equipment through the network. The communication control device 2007 may be used, for example, to communicate with the computer 20, which operates as the object tracking apparatus 1, and the repeater 5 through the communications network 4 (see FIG. 2). For example, when the object tracking apparatus 1 and the external apparatus 3 in FIG. 1 are connected to each other through a network, the communication control device 2007 may be used, for example, to communicate with the computer 20, which operates as the object tracking apparatus 1, and the external apparatus 3.

The medium drive device 2008 reads the programs and data recorded on a portable recording medium 21 and writes data and so on, stored in the auxiliary storage device 2003, to the portable recording medium 21. The medium drive device 2008 may be implemented by, for example, a memory card reader/writer that complies with one or more kinds of standard. When a memory card reader/writer is used as the medium drive device 2008, the portable recording medium 21 may be implemented by a memory card (flash memory) or the like according to a standard supported by the memory card reader/writer, for example, a Secure Digital (SD) standard. For example, a flash memory having a USB standard connector may be used as the portable recording medium 21. In addition, when the computer 20 has an optical disk drive that is usable as the medium drive device 2008, various optical disks that are recognizable by the optical disk drive may be used as the portable recording medium 21. Examples of the optical disk that is usable as the portable recording medium 21 include a compact disk (CD), a digital versatile disc (DVD), and a Blu-ray Disc (registered trademark). The portable recording medium 21 may be used, for example, to store the above-described object tracking program. The portable recording medium 21 may also be used, for example, to store the video data 191, the background information 192, the object feature information 193, the object position information 194, the priority camera information 195, and so on.

When an instruction for starting the object tracking program is input to the computer 20, the processor 2001 reads the object tracking program stored in a non-transitory recording medium, such as the auxiliary storage device 2003, and executes the object tracking program. While executing the object tracking program, the processor 2001 functions (operates) as the tracking unit 120, the movement-destination predicting unit 130, and the priority-camera determination unit 140 in the object tracking apparatus 1. When the object tracking program includes a process for acquiring pieces of video captured by the respective cameras 2, the processor 2001 also functions as the video acquisition unit 110. In addition, when the object tracking program includes a process for outputting various types of data including the video data 191 and the object position information 194 to the external apparatus 3, the processor 2001 also functions as the output unit 150. The input/output interface 2006, the communication control device 2007, and the medium drive device 2008 in the computer 20 assume some of the functions of the video acquisition unit 110 and the output unit 150 in the object tracking apparatus 1. While executing the object tracking program, the RAM in the primary storage device 2002 and a storage device, such as the auxiliary storage device 2003, function as the storage unit 190 in the object tracking apparatus 1.

The computer 20 that operates as the object tracking apparatus 1 may or may not include all the elements 2001 to 2008 illustrated in FIG. 19, and one or more of the elements 2001 to 2008 may be omitted depending on use and a condition. For example, the computer 20 may be a computer in which the medium drive device 2008 is omitted. The object tracking apparatus 1 may also be realized by, for example, a plurality of computers connected through a network and programs to be executed by the respective computers.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An object tracking apparatus comprising:
   a memory; and
   a processor coupled to the memory and configured to
   execute a tracking process that includes
      detecting one or more objects to be tracked from frames included in a set of frames of a same time point in pieces of video captured by respective cameras, and
      calculating, for each object to be tracked, a three-dimensional position of the object in real space, based on positions of the object in the frames from which the object is detected,
   execute, for each object to be tracked, a prediction process that includes predicting positions of the object in next frames that are included in the pieces of video and from which the object is to be detected next, based on the three-dimensional position of the object,
   execute an influence-degree obtaining process that includes comparing, for each object to be tracked, a feature of the object to be tracked in each of the next frames in the pieces of video with a feature of another object that overlaps the object to be tracked at a back side of each predicted position of the object to be tracked, based on the predicted positions of the object in next frames, to calculate a backside influence degree that the other object has on detection of the object to be tracked, and
   execute a difficulty-degree obtaining process that includes calculating, for each object to be tracked, a detection difficulty degree for detecting the object from each of the next frames captured by the respective cameras, based on the backside influence degree,
   wherein the tracking process is configured to
   select, the next frames within a predetermined number in an order of a small detection difficulty from among the next frames that are included in the set of next frames in the pieces of video and from which the object is to be detected, and
   detect the object from the selected next frames.

2. The object tracking apparatus according to claim 1, wherein the difficulty-degree obtaining process is configured to include, in the other object, an accompanying portion that accompanies an object that is included in the objects detected from the frames and that is not processed.

3. The object tracking apparatus according to claim 1, wherein the processor is further configured to
   execute an occlusion-degree calculation process that includes calculating, for each object to be tracked, an occlusion degree indicating, in each of the next frames in the pieces of video, a degree of being occluded by another object that exists at a front side of the object to be tracked, based on the predicted positions of the object in next frames, and
   execute a predicted-influence-degree calculation process that includes
   calculating an amount of movement between a frame included in each of the pieces of video and currently processed and the next frame, and
   calculating a predicted influence degree indicating a degree of influence that the calculated amount of movement has on a detection accuracy of the object,
   wherein the difficulty-degree obtaining process is configured to calculate each detection difficulty degree, based on the corresponding backside influence degree, occlusion degree, and predicted influence degree.

4. The object tracking apparatus according to claim 1, wherein the tracking process is configured to detect the objects to be tracked from the frames in an ascending order of the detection difficulty degrees for the objects to be tracked.

5. The object tracking apparatus according to claim 1, wherein the tracking process is configured to set, for the respective frames from which the object is detected, restriction regions indicating a permissible range of the three-dimensional position of the object in real space, based on detection positions of the object in the respective frames and the detection difficulty degrees, and to calculate the three-dimensional position of the object, based on a region where the restriction regions overlap in real space.

6. An object tracking method comprising:
executing a tracking process that includes
detecting one or more objects to be tracked from frames included in a set of frames of a same time point in pieces of video captured by respective cameras, and
calculating, for each object to be tracked, a three-dimensional position of the object in real space, based on positions of the object in the frames from which the object is detected,
executing, for each object to be tracked, a prediction process that includes predicting positions of the object in next frames that are included in the pieces of video and from which the object is to be detected next, based on the three-dimensional position of the object,
executing an influence-degree obtaining process that includes comparing, for each object to be tracked, a feature of the object to be tracked in each of the next frames in the pieces of video with a feature of another object that overlaps the object to be tracked at a back side of each predicted position of the object to be tracked, based on the predicted positions of the object in next frames, to calculate a backside influence degree that the other object has on detection of the object to be tracked, and
executing a difficulty-degree obtaining process that includes calculating, for each object to be tracked, a detection difficulty degree for detecting the object from each of the next frames captured by the respective cameras, based on the backside influence degree,
wherein the tracking process is configured to select the next frames within a predetermined number in an order of a small detection difficulty from among the next frames that are included in the set of next frames in the pieces of video and from which the object is to be detected, and
detect the object from the selected next frames.

7. The object tracking method according to claim 6,
wherein the difficulty-degree obtaining process is configured to include, in the other object, an accompanying portion that accompanies an object that is included in the objects detected from the frames and that is not processed.

8. The object tracking method according to claim 6, further comprising:
executing an occlusion-degree calculation process that includes calculating, for each object to be tracked, an occlusion degree indicating, in each of the next frames in the pieces of video, a degree of being occluded by another object that exists at a front side of the object to be tracked, based on the predicted positions of the object in next frames, and
executing a predicted-influence-degree calculation process that includes calculating an amount of movement between a frame included in each of the pieces of video and currently processed and the next frame, and
calculating a predicted influence degree indicating a degree of influence that the calculated amount of movement has on a detection accuracy of the object,
wherein the difficulty-degree obtaining process is configured to calculate each detection difficulty degree, based on the corresponding backside influence degree, occlusion degree, and predicted influence degree.

9. The object tracking method according to claim 6,
wherein the tracking process is configured to detect the objects to be tracked from the frames in an ascending order of the detection difficulty degrees for the objects to be tracked.

10. The object tracking method according to claim 6,
wherein the tracking process is configured to set, for the respective frames from which the object is detected, restriction regions indicating a permissible range of the three-dimensional position of the object in real space, based on detection positions of the object in the respective frames and the detection difficulty degrees, and to calculate the three-dimensional position of the object, based on a region where the restriction regions overlap in real space.

11. A non-transitory computer-readable storage medium for storing a program for object tracking, the program causing a processor to perform processing for distance measuring, the processing comprising:
executing a tracking process that includes
detecting one or more objects to be tracked from frames included in a set of frames of a same time point in pieces of video captured by respective cameras, and
calculating, for each object to be tracked, a three-dimensional position of the object in real space, based on positions of the object in the frames from which the object is detected,
executing, for each object to be tracked, a prediction process that includes predicting positions of the object in next frames that are included in the pieces of video and from which the object is to be detected next, based on the three-dimensional position of the object,
executing an influence-degree obtaining process that includes comparing, for each object to be tracked, a feature of the object to be tracked in each of the next frames in the pieces of video with a feature of another object that overlaps the object to be tracked at a back side of each predicted position of the object to be tracked, based on the predicted positions of the object in next frames, to calculate a backside influence degree that the other object has on detection of the object to be tracked, and
executing a difficulty-degree obtaining process that includes calculating, for each object to be tracked, a detection difficulty degree for detecting the object from each of the next frames captured by the respective cameras, based on the backside influence degree,
wherein the tracking process is configured to
select the next frames within a predetermined number in an order of a small detection difficulty from among the next frames that are included in the set of next frames in the pieces of video and from which the object is to be detected, and
detect the object from the selected next frames.

12. The non-transitory computer-readable storage medium according to claim 11,
wherein the difficulty-degree obtaining process is configured to include, in the other object, an accompanying portion that accompanies an object that is included in the objects detected from the frames and that is not processed.

13. The non-transitory computer-readable storage medium according to claim 11, the processing further comprising:
executing an occlusion-degree calculation process that includes calculating, for each object to be tracked, an occlusion degree indicating, in each of the next frames in the pieces of video, a degree of being occluded by another object that exists at a front side of the object to be tracked, based on the predicted positions of the object in next frames, and executing a predicted-influence-degree calculation process that includes calculating an amount of movement between a frame included in each of the pieces of video and currently processed and the next frame, and calculating a predicted influence degree indicating a degree of influence that the calculated amount of movement has on a detection accuracy of the object, wherein the difficulty-degree obtaining process is configured to calculate each detection difficulty degree, based on the corresponding backside influence degree, occlusion degree, and predicted influence degree.

14. The non-transitory computer-readable storage medium according to claim 11, wherein the tracking process is configured to detect the objects to be tracked from the frames in an ascending order of the detection difficulty degrees for the objects to be tracked.

15. The non-transitory computer-readable storage medium according to claim 6, wherein the tracking process is configured to set, for the respective frames from which the object is detected, restriction regions indicating a permissible range of the three-dimensional position of the object in real space, based on detection positions of the object in the respective frames and the detection difficulty degrees, and to calculate the three-dimensional position of the object, based on a region where the restriction regions overlap in real space.

\* \* \* \* \*